US012641268B2

(12) United States Patent
Abe et al.

(10) Patent No.: US 12,641,268 B2
(45) **Date of Patent: *May 26, 2026**

(54) ENCODER, DECODER, ENCODING METHOD, AND DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,551

(22) Filed: Dec. 11, 2024

(65) Prior Publication Data

US 2025/0106418 A1 Mar. 27, 2025

Related U.S. Application Data

(63) Continuation of application No. 18/511,134, filed on Nov. 16, 2023, now Pat. No. 12,206,877, which is a continuation of application No. 17/356,839, filed on Jun. 24, 2021, now Pat. No. 11,889,094, which is a continuation of application No. 16/449,685, filed on Jun. 24, 2019, now Pat. No. 11,095,909.

(Continued)

(51) Int. Cl.
*H04N 19/423* (2014.01)
*H04N 19/105* (2014.01)

*H04N 19/176* (2014.01)
*H04N 19/517* (2014.01)

(52) U.S. Cl.
CPC ......... *H04N 19/423* (2014.11); *H04N 19/105* (2014.11); *H04N 19/176* (2014.11); *H04N 19/517* (2014.11)

(58) Field of Classification Search
CPC .................................................. H04N 13/243
USPC ...................................... 375/240.16
See application file for complete search history.

(56) References Cited

U.S. PATENT DOCUMENTS

2012/0134415 A1* 5/2012 Lin ...................... H04N 19/517
375/E7.243
2013/0336406 A1 12/2013 Zhang
(Continued)

OTHER PUBLICATIONS

H.265 (ISO/IEC 23008-2 High efficiency video coding (HEVC)), Dec. 1, 2013.

*Primary Examiner* — Amir Shahnami
(74) *Attorney, Agent, or Firm* — Wenderoth, Lind & Ponack, L.L.P.

(57) ABSTRACT

An encoder includes circuitry and memory. Using the memory, the circuitry performs prediction on an image. A motion vector predictor list used in the prediction includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. The plurality of predetermined positions are defined by a regular interval using the top-left of a current picture as a reference point.

2 Claims, 30 Drawing Sheets

Related U.S. Application Data

(60) Provisional application No. 62/689,461, filed on Jun. 25, 2018.

(56) References Cited

U.S. PATENT DOCUMENTS

| 2015/0319451 | A1 | 11/2015 | Henry |
| 2019/0215530 | A1 | 7/2019 | Bici |

* cited by examiner

| TRANSFORM TYPE | BASIS FUNCTION $T_i(j)$, $i, j = 0, 1, ..., N - 1$ |
|---|---|
| DCT - II | $T_i(j) = \omega_0 \cdot \sqrt{\dfrac{2}{N}} \cdot \cos\left(\dfrac{\pi \cdot i \cdot (2j + 1)}{2N}\right)$<br><br>WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N - 1}} \cdot \cos\left(\dfrac{2\pi \cdot i \cdot j}{2N - 1}\right)$<br><br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N + 1}} \cdot \cos\left(\dfrac{\pi \cdot (2i + 1) \cdot (2j + 1)}{4N + 2}\right)$ |
| DST - I | $T_i(j) = \sqrt{\dfrac{2}{N + 1}} \cdot \sin\left(\dfrac{\pi \cdot (i + 1) \cdot (j + 1)}{N + 1}\right)$ |
| DST - VII | $T_i(j) = \sqrt{\dfrac{4}{2N + 1}} \cdot \sin\left(\dfrac{\pi \cdot (2i + 1) \cdot (j + 1)}{2N + 1}\right)$ |

0 : PLANAR
1 : DC

FIG. 10

CURRENT CTU

CURRENT BLOCK

4×4 UNIT POSITION

RECORDED POSITION OF MOTION VECTOR INFORMATION FOR SPATIALLY BROAD MOTION VECTOR PREDICTOR

SPATIALLY BROAD MOTION VECTOR PREDICTOR REFERENCE POSITION

SPATIALLY NEIGHBORING MOTION VECTOR PREDICTOR REFERENCE POSITION

FIG. 14

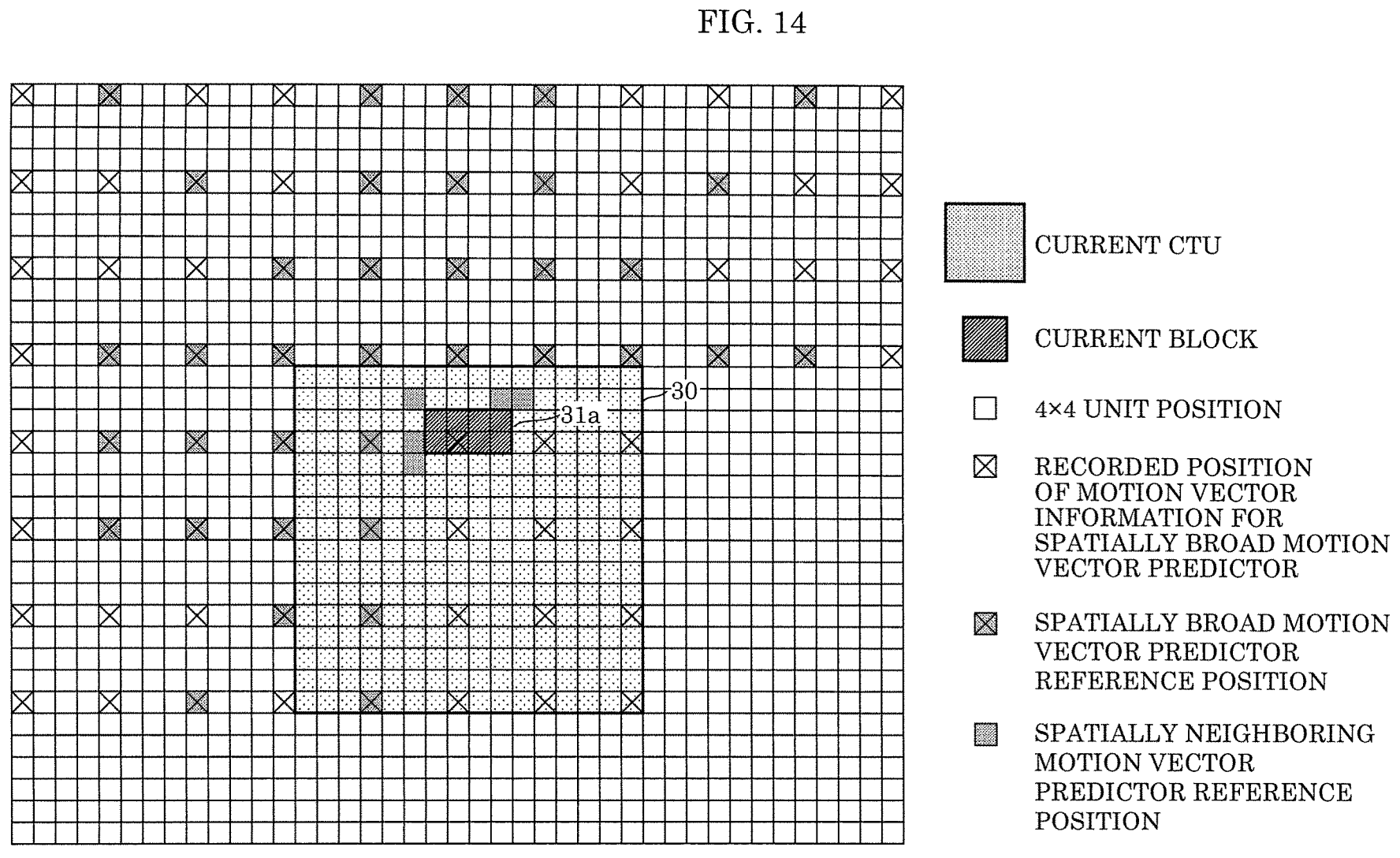

CURRENT CTU

CURRENT BLOCK

4×4 UNIT POSITION

RECORDED POSITION OF MOTION VECTOR INFORMATION FOR SPATIALLY BROAD MOTION VECTOR PREDICTOR

SPATIALLY BROAD MOTION VECTOR PREDICTOR REFERENCE POSITION

SPATIALLY NEIGHBORING MOTION VECTOR PREDICTOR REFERENCE POSITION

30

31a

CURRENT CTU

CURRENT BLOCK

4×4 UNIT POSITION

RECORDED POSITION
OF MOTION VECTOR
INFORMATION FOR
SPATIALLY BROAD MOTION
VECTOR PREDICTOR

SPATIALLY BROAD MOTION
VECTOR PREDICTOR
REFERENCE POSITION

SPATIALLY NEIGHBORING
MOTION VECTOR
PREDICTOR REFERENCE
POSITION ex115

ENCODER, DECODER, ENCODING METHOD, AND DECODING METHOD

CROSS REFERENCE TO RELATED APPLICATIONS

This application is a continuation of U.S. application Ser. No. 18/511,134 filed on Nov. 16, 2023, which is a continuation of U.S. application Ser. No. 17/356,839, now U.S. Pat. No. 11,889,094, filed on Jun. 24, 2021, which is a continuation of U.S. application Ser. No. 16/449,685, now U.S. Pat. No. 11,095,909, filed on Jun. 24, 2019, claiming the benefit of priority of of U.S. Provisional Patent Application No. 62/689,461 filed Jun. 25, 2018. The entire disclosure of the above-identified application, including the specification, drawings and claims is incorporated herein by reference in its entirety.

FIELD

The present disclosure relates to, for example, an encoder that encodes a video including a plurality of pictures.

BACKGROUND

One example of a conventional video encoding standard is H.265, also referred to as high efficiency video coding (HEVC) (Non Patent Literature (NPL) 1).

CITATION LIST

Non Patent Literature

[NPL 1]H.265 (ISO/IEC 23008-2 HEVC)/HEVC (High Efficiency Video Coding)

SUMMARY

Technical Problem

However, prediction precision can be improved upon. Moreover, when prediction precision is improved, the amount of information to be stored in, for example, memory, increases, and the scale of the circuitry increases.

In view of this, the present disclosure provides an encoder, etc., that further improves prediction precision, and can reduce the accompanying increase in information to be stored in, for example, memory, and increase in circuitry scale.

Solution to Problem

An encoder according to one aspect of the present disclosure encodes a video and includes circuitry and memory. Using the memory, the circuitry generates a motion vector predictor list by registering motion vector predictors obtained by referencing a plurality of encoded blocks, selects one motion vector predictor from the motion vector predictor list, and implements a prediction mode that performs motion compensation using a motion vector derived from the one motion vector predictor. The motion vector predictor list includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block.

Information on motion vectors to be referenced in the prediction mode is managed in association with reference blocks of a specific size. The plurality of predetermined positions are positions of, from among the reference blocks, reference blocks in positions defined by a regular interval using a current picture as a reference.

Note that these general and specific aspects may be implemented using a system, a device, a method, an integrated circuit, a computer program, or a non-transitory computer-readable recording medium such as a CD-ROM, or any combination thereof.

Advantageous Effects

The encoder, etc., according to one aspect of the present disclosure further improves prediction precision, and can reduce the accompanying increase in information to be stored in, for example, memory, and increase in circuitry scale.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram illustrating a functional configuration of the encoder according to Embodiment 1.

FIG. 3 is a chart indicating transform basis functions for each transform type.

FIG. 10 is a block diagram illustrating a functional configuration of the decoder according to Embodiment 1.

FIG. 14 illustrates a second method of referencing spatially broad vectors in merge mode that uses spatially broad motion vector predictors according to Embodiment 1.

DESCRIPTION OF EMBODIMENTS

Figure 2:
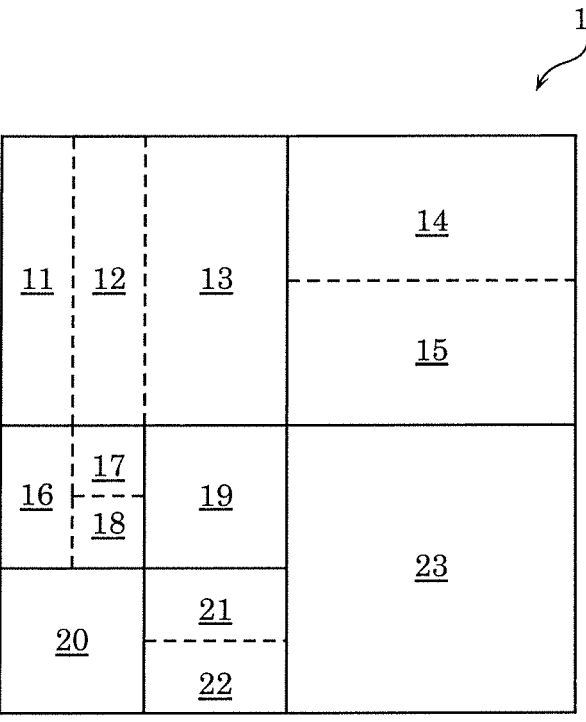
FIG. 2 illustrates one example of block splitting according to Embodiment 1.

Underlying Knowledge Forming Basis of the
Present Disclosure

For example, in H.265, various prediction modes can be used in the encoding, etc., of a video. In a prediction mode, for example, encoder 100 or decoder 200 performs prediction by selecting an appropriate motion vector from motion vector candidates derived from motion vector information on processed blocks that neighbor the current block, and performing motion compensation.

For example, restricting blocks to be referenced for deriving the motion vector candidates to only encoded blocks that neighbor the current block prevents appropriate selection of motion vectors and merely improves coding efficiency by a certain amount. Moreover, assume encoder 100 or decoder 200 also refer to other blocks in addition to the encoded blocks that neighbor the current block, in order to select more appropriate motion vectors compared to those selected with conventional techniques. In such a case, the amount of information that encoder 100 or decoder 200 is to store in, for example, memory, increases, and the scale of the circuitry included in encoder 100 or decoder 200 increases.

For example, an encoder according to one aspect of the present disclosure encodes a video and includes circuitry and memory. Using the memory, the circuitry generates a motion vector predictor list by registering motion vector predictors obtained by referencing a plurality of encoded blocks, selects one motion vector predictor from the motion vector predictor list, and implements a prediction mode that performs motion compensation using a motion vector derived from the one motion vector predictor. The motion vector predictor list includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. Information on motion vectors to be referenced in the prediction mode is managed in association with reference blocks of a specific size. The plurality of predetermined positions are positions of, from among the reference blocks, reference blocks in positions defined by a regular interval using a current picture as a reference.

This enables the encoder to obtain motion vectors by referencing blocks in a range that is broader than the conventional range. Accordingly, the encoder can improve coding efficiency since more appropriate motion vectors can be selected than those selected with conventional techniques. Moreover, since the blocks to be referenced are blocks positioned at a regular interval, the number of blocks to be referenced can be reduced. Accordingly, the encoder allows for a reduction in the scale of the circuitry included in the encoder since the amount of information to be stored in, for example, memory, can be reduced. Moreover, the encoder can make the blocks to be referenced to be blocks having the same size. Moreover, the encoder can manage motion vectors on a block-by-block basis of blocks having the same size.

Moreover, for example, in the encoder according to one aspect of the present disclosure, the prediction mode is a merge mode.

This enables the encoder to, upon prediction, select appropriate motion vectors from among motion vector candidates derived from motion information on encoded blocks, and encode only those indices that indicate motion vector information. This in turn enables the encoder to inhibit the motion vector encoding amount.

Moreover, for example, in the encoder according to one aspect of the present disclosure, blocks positioned at the plurality of predetermined positions are defined as reference blocks of a specific size, and information on motion vectors to be referenced in the prediction mode is managed in association with the reference blocks.

This enables the encoder to make the blocks to be referenced to be blocks having the same size. Moreover, the encoder can manage motion vectors on a block-by-block basis of blocks having the same size.

Moreover, for example, in the encoder according to one aspect of the present disclosure, the reference block has a size of 4×4 pixels.

This enables the encoder to reference blocks for obtaining motion vectors in units of 4×4 pixel blocks.

Moreover, for example, in the encoder according to one aspect of the present disclosure, the regular interval is an interval of 16 pixels in a horizontal direction and 16 pixels in a vertical direction.

This enables the encoder to reference blocks for obtaining motion vectors spaced 16 pixels apart.

Moreover, for example, in the encoder according to one aspect of the present disclosure, the block positioned at any of the plurality of predetermined positions is, from among a plurality of reference blocks each defined as the reference block, a block that is positioned outside of the current block and is one of a predetermined number of sequential reference blocks in any one of down, left-down, left, left-up, up, right-up, and right directions, from at least one of reference blocks that are closest to the current block from among reference blocks that are in positions defined by the regular interval and cover top and left sides of the current block.

This enables the encoder to obtain more motion vectors than with conventional techniques, by referencing blocks in positions that surround the current block and blocks in the surrounding area thereof. Accordingly, in prediction mode, the encoder can select more appropriate motion vectors than those selected with conventional techniques.

Moreover, for example, in the encoder according to one aspect of the present disclosure, the surrounding blocks in the spatially broad area may be processed blocks in sequences of blocks selected such that, regardless of the size of the current block, the number of sequences of sequential blocks in the left and up directions, regarding the left and top edges on the outside of and closest to the current block, is a specific number or less.

This enables the encoder to restrict the number of blocks to be referenced for obtaining motion vectors. Accordingly, the encoder allows for the amount of information to be stored in, for example, memory, to be reduced, and allows for a reduction in the scale of the circuitry included in the encoder.

Moreover, for example, in the encoder according to one aspect of the present disclosure, the circuitry: scans, in a specific order of proximity to the current block, blocks positioned at any one of the plurality of predetermined positions in a range that is broader than a range that spatially neighbors the current block; and registers the motion vector predictors obtained from the blocks positioned at any one of the plurality of predetermined positions in the range that is broader than the range that spatially neighbors the current block into the motion vector predictor list as the spatially broad motion vector predictors, until a total number of the motion vector predictors registered reaches a first number.

This enables the encoder to obtain motion vectors by referencing blocks in the surrounding area of the current block, in order of proximity to the current block. Moreover, the encoder can register a predetermined number of the obtained motion vectors as a list. This enables the encoder to hold, as a list, motion vectors obtained by referencing blocks in a range that is broader than the conventional range.

Moreover, for example, in the encoder according to one aspect of the present disclosure, the circuitry is capable of adaptively changing the regular interval or the second range based on a capability of the encoder or a size of the current picture.

This enables the encoder to reference an appropriate number of blocks in prediction mode, based on the capability of the encoder or the size of the current picture. Accordingly, the encoder can store, in memory, etc., an appropriate amount of information based on the capability of the encoder or the size of the current picture.

Moreover, for example, in the encoder according to one aspect of the present disclosure, the circuitry writes, into the slice, picture, or sequence header, information specifying the regular interval or the second range.

This enables the encoder to specify the number of blocks, for example, to be referenced in prediction mode, on a per-slice, per-picture, or per-sequence basis.

Moreover, for example, in the encoder according to one aspect of the present disclosure, when the capability of the encoder is a first capability that is lower than a first reference, the regular interval is a first interval, and when the capability of the encoder is a second capability that is higher than the first reference, the regular interval is a second interval that is narrower than the first interval.

With this, when the capability of the encoder is lower than a reference capability, the encoder can restrict the number of blocks to be referenced by increasing the interval between positions of blocks to be referenced. Moreover, with this, when the capability of the encoder is higher than a reference capability, the encoder can increase the number of blocks to be referenced to more than when the capability of the encoder is lower than a reference capability, by reducing the interval between positions of blocks to be referenced. Accordingly, the encoder can appropriately set the number of blocks to be referenced in accordance with the capability of the encoder.

Moreover, for example, in the encoder according to one aspect of the present disclosure, when the capability of the encoder is a third capability that is lower than a second reference, the number of reference blocks in predetermined positions in the second range to be referenced for motion vector predictor list generation is a first number, and when the capability of the encoder is a fourth capability that is higher than the second reference, the number of reference blocks in predetermined positions in the second range to be referenced for motion vector predictor list generation is a second number that is greater than the first number.

With this, when the capability of the encoder is lower than a reference capability, the encoder can restrict the number of blocks to be referenced by reducing the range of positions of blocks to be referenced. Moreover, with this, when the capability of the encoder is higher than a reference capability, the encoder can increase the number of blocks to be referenced to more than when the capability of the encoder is lower than a reference capability, by increasing the range of positions of blocks to be referenced. Accordingly, the encoder can appropriately set the number of blocks to be referenced in accordance with the capability of the encoder.

Moreover, for example, in the encoder according to one aspect of the present disclosure, when the size of the current picture is a first size that is larger than a third reference, the regular interval is a third interval, and when the size of the current picture is a second size that is smaller than the third reference, the regular interval is a fourth interval that is narrower than the third interval.

With this, when the size of the current picture is larger than a reference size, by increasing the interval between blocks to be referenced, the encoder can prevent the number of blocks to be referenced from excessively increasing, more so than when the size of the current picture is smaller than a reference size. In other words, the encoder can reduce the number of blocks to be referenced when the size of the current picture is larger than a reference size. Moreover, with this, when the size of the current picture is smaller than a reference size, by reducing the interval between blocks to be referenced, the encoder can secure a sufficient number of blocks to be referenced, more so than when the size of the current picture is larger than a reference size. In other words, when the size of the current picture is smaller than a reference size, the encoder can prevent the number of blocks to be referenced from being insufficient and thus prevent the inability to use a sufficient amount of motion vectors in prediction mode. Accordingly, the encoder can appropriately set the number of blocks to be referenced in accordance with the size of the current picture.

Moreover, for example, in the encoder according to one aspect of the present disclosure, when the size of the current picture is a third size that is larger than a fourth reference, the number of reference blocks in predetermined positions in the second range to be referenced for motion vector predictor list generation is a third number, and when the size of the current picture is a fourth size that is smaller than the fourth reference, the number of reference blocks in predetermined positions in the second range to be referenced for motion vector predictor list generation is a fourth number that is less than the third number.

With this, when the size of the current picture is larger than a reference size, the encoder can increase the number of blocks to be referenced, more so than when the size of the current picture is smaller than a reference size. Moreover, with this, when the size of the current picture is smaller than a reference size, the encoder can restrict number of blocks to be referenced, more so than when the size of the current picture is larger than a reference size. Accordingly, the encoder can appropriately set the number of blocks to be referenced in accordance with the size of the current picture.

Moreover, for example, in the encoder according to one aspect of the present disclosure, the circuitry stores information on motion vectors assigned to reference blocks in the memory.

This enables the encoder to store, in memory, etc., information on motion vectors on a block-by-block basis of blocks that have the same, specific size.

Moreover, for example, in the encoder according to one aspect of the present disclosure, the circuitry stores information on motion vectors in units of reference blocks in the memory, and when the current block is a block including one of the reference blocks in a position defined by the regular interval, stores information on a motion vector derived from the current block in the memory.

This enables the encoder to store, in memory, etc., information on motion vectors obtained from blocks in positions that surround the current block and blocks in the surrounding area thereof. Moreover, this enables the encoder to store, in memory, etc., information on motion vectors on a block-by-block basis of blocks that have the same, specific size.

Moreover, for example, in the encoder according to one aspect of the present disclosure, when the current block is a last block in a current CTU, the circuitry enables deletion of, from among information on the motion vectors stored in the memory, information on a motion vector in a region that will not be used in referencing performed in subsequent CTU processing.

This enables the encoder to reduce the amount of information to be stored in, for example, memory, by enabling deletion of information that will not be referenced in subsequent CTU processing.

For example, a decoder according to one aspect of the present disclosure decodes a video and includes circuitry and memory. Using the memory, the circuitry generates a motion vector predictor list by registering motion vector predictors obtained by referencing a plurality of decoded blocks, selects one motion vector predictor from the motion vector predictor list, and implements a prediction mode that performs motion compensation using a motion vector derived from the one motion vector predictor. The motion vector predictor list includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. Information on motion vectors to be referenced in the prediction mode is managed in association with reference blocks of a specific size. The plurality of predetermined positions are positions of, from among the reference blocks, reference blocks in positions defined by a regular interval using a top-left of a current picture as a reference point.

This enables the decoder to obtain motion vectors by referencing blocks in a range that is broader than the conventional range. Accordingly, the decoder can improve decoding efficiency since more appropriate motion vectors can be selected than those selected with conventional techniques. Moreover, since the blocks to be referenced are blocks positioned at a regular interval, the number of blocks to be referenced can be reduced. Accordingly, the decoder allows for a reduction in the scale of the circuitry included in the decoder since the amount of information to be stored in, for example, memory, can be reduced. Moreover, the decoder can make the blocks to be referenced to be blocks having the same size. Moreover, the decoder can manage motion vectors on a block-by-block basis of blocks having the same size.

Moreover, for example, in the decoder according to one aspect of the present disclosure, the prediction mode is a merge mode.

This enables the decoder to, upon prediction, perform motion compensation using motion vectors obtained by decoding the indices indicating motion vector information. This in turn enables the decoder to inhibit the coding amount.

Moreover, for example, in the decoder according to one aspect of the present disclosure, blocks positioned at the plurality of predetermined positions are defined as reference blocks of a specific size, and information on motion vectors to be referenced in the prediction mode is managed in association with the reference blocks.

With this, the decoder can make the blocks to be referenced to be blocks having the same size. Moreover, the decoder can manage motion vectors on a block-by-block basis of blocks having the same size.

Moreover, for example, in the decoder according to one aspect of the present disclosure, the reference block has a size of 4×4 pixels.

This enables the decoder to reference blocks for obtaining motion vectors in units of 4×4 pixel blocks.

Moreover, for example, in the decoder according to one aspect of the present disclosure, the regular interval is an interval of 16 pixels in a horizontal direction and 16 pixels in a vertical direction.

This enables the decoder to reference blocks for obtaining motion vectors spaced 16 pixels apart.

Moreover, for example, in the decoder according to one aspect of the present disclosure, the block positioned at any of the plurality of predetermined positions is, from among a plurality of reference blocks each defined as the reference block, a block that is positioned outside of the current block and is one of a predetermined number of sequential reference blocks in any one of down, left-down, left, left-up, up, right-up, and right directions, from at least one of reference blocks that are closest to the current block from among reference blocks that are in positions defined by the regular interval and cover top and left sides of the current block.

This enables the decoder to obtain more motion vectors than with conventional techniques, by referencing blocks in positions that surround the current block and blocks in the surrounding area thereof. Accordingly, in prediction mode, the decoder can select more appropriate motion vectors than those selected with conventional techniques.

Moreover, for example, in the decoder according to one aspect of the present disclosure, a block positioned in the predetermined position of the current block is a decoded block in sequences of blocks selected such that the number of sequences of sequential blocks in the left and up directions, regarding the left and top edges on the outside of and closest to the current block, is a predetermined number or less.

This enables the decoder to restrict the number of blocks to be referenced for obtaining motion vectors. Accordingly, the decoder allows for a reduction in the scale of the circuitry included in the decoder since the amount of information to be stored in, for example, memory, can be reduced.

Moreover, for example, in the decoder according to one aspect of the present disclosure, the circuitry: scans, in a specific order of proximity to the current block, blocks positioned at any one of the plurality of predetermined positions in a range that is broader than a range that spatially neighbors the current block; and registers the motion vector predictors obtained from the blocks positioned at any one of the plurality of predetermined positions in the range that is broader than the range that spatially neighbors the current block into the motion vector predictor list as the spatially broad motion vector predictors, until a total number of the motion vector predictors registered reaches a first number.

This enables the decoder to obtain motion vectors by referencing blocks in the surrounding area of the current block, in order of proximity to the current block. Moreover, the decoder can register a predetermined number of the obtained motion vectors as a list. This enables the decoder to hold, as a list, motion vectors obtained by referencing blocks in a range that is broader than the conventional range.

Moreover, for example, in the decoder according to one aspect of the present disclosure, the circuitry is capable of adaptively changing the regular interval or the second range based on a capability of the decoder or a size of the current picture.

This enables the decoder to reference an appropriate number of blocks in prediction mode, based on the capability of the decoder or the size of the current picture. Accordingly, the decoder can store, in memory, etc., an appropriate amount of information based on the capability of the decoder or the size of the current picture.

Moreover, for example, the decoder according to one aspect of the present disclosure writes, into the slice, picture, or sequence header, information specifying the regular interval or the second range.

This enables the decoder to specify the number of blocks, for example, to be referenced in prediction mode, on a per-slice, per-picture, or per-sequence basis.

Moreover, for example, in the decoder according to one aspect of the present disclosure, when the capability of the decoder is a first capability that is lower than a first reference, the regular interval is a first interval, and when the capability of the decoder is a second capability that is higher than the first reference, the regular interval is a second interval that is narrower than the first interval.

With this, when the capability of the decoder is lower than a reference capability, the decoder can restrict the number of blocks to be referenced by increasing the interval between positions of blocks to be referenced. Moreover, with this, when the capability of the decoder is higher than a reference capability, the decoder can increase the number of blocks to be referenced to more than when the capability of the decoder is lower than a reference capability, by reducing the interval between positions of blocks to be referenced. Accordingly, the decoder can appropriately set the number of blocks to be referenced in accordance with the capability of the decoder.

Moreover, for example, in the decoder according to one aspect of the present disclosure, when the capability of the decoder is a third capability that is lower than a second reference, the number of reference blocks in predetermined positions in the second range to be referenced for motion vector predictor list generation is a first number, and when the capability of the decoder is a fourth capability that is higher than the second reference, the number of reference blocks in predetermined positions in the second range to be referenced for motion vector predictor list generation is a second number that is greater than the first number.

With this, when the capability of the decoder is lower than a reference capability, the decoder can restrict the number of blocks to be referenced by reducing the range of positions of blocks to be referenced. Moreover, with this, when the capability of the decoder is higher than a reference capability, the decoder can increase the number of blocks to be referenced to more than when the capability of the decoder is lower than a reference capability, by increasing the range of positions of blocks to be referenced. Accordingly, the decoder can appropriately set the number of blocks to be referenced in accordance with the capability of the decoder.

Moreover, for example, in the decoder according to one aspect of the present disclosure, when the size of the current picture is a first size that is larger than a third reference, the regular interval is a third interval, and when the size of the current picture is a second size that is smaller than the third reference, the regular interval is a fourth interval that is narrower than the third interval.

With this, when the size of the current picture is larger than a reference size, by increasing the interval between blocks to be referenced, the decoder can prevent the number of blocks to be referenced from excessively increasing, more so than when the size of the current picture is smaller than a reference size. In other words, the decoder can reduce the number of blocks to be referenced when the size of the current picture is larger than a reference size. Moreover, with this, when the size of the current picture is smaller than a reference size, by reducing the interval between blocks to be referenced, the decoder can secure a sufficient number of blocks to be referenced, more so than when the size of the current picture is larger than a reference size. In other words, when the size of the current picture is smaller than a reference size, the decoder can prevent the number of blocks to be referenced from being insufficient and thus prevent the inability to use a sufficient amount of motion vectors in prediction mode. Accordingly, the decoder can appropriately set the number of blocks to be referenced in accordance with the size of the current picture.

Moreover, for example, in the decoder according to one aspect of the present disclosure, when the size of the current picture is a third size that is larger than a fourth reference, the number of reference blocks in predetermined positions in the second range to be referenced for motion vector predictor list generation is a third number, and when the size of the current picture is a fourth size that is smaller than the fourth reference, the number of reference blocks in predetermined positions in the second range to be referenced for motion vector predictor list generation is a fourth number that is less than the third number.

With this, when the size of the current picture is larger than a reference size, the decoder can increase the number of blocks to be referenced, more so than when the size of the current picture is smaller than a reference size. Moreover, with this, when the size of the current picture is smaller than a reference size, the decoder can restrict number of blocks to be referenced, more so than when the size of the current picture is larger than a reference size. Accordingly, the decoder can appropriately set the number of blocks to be referenced in accordance with the size of the current picture.

Moreover, for example, in the decoder according to one aspect of the present disclosure, the circuitry stores information on motion vectors assigned to reference blocks in the memory.

This enables the decoder to store, in memory, etc., information on motion vectors on a block-by-block basis of blocks that have the same, specific size.

Moreover, for example, in the decoder according to one aspect of the present disclosure, the circuitry stores information on motion vectors assigned to the reference blocks in the memory, and when the current block is a block including one of the reference blocks in a position defined by the regular interval, stores information on a motion vector derived from the current block in the memory.

This enables the decoder to store, in memory, etc., information on motion vectors obtained from blocks in positions that surround the current block and blocks in the surrounding area thereof. Moreover, the decoder can store, in memory, etc., information on motion vectors on a block-by-block basis of blocks that have the same, specific size.

Moreover, for example, in the decoder according to one aspect of the present disclosure, when the current block is a last block in a current CTU, the circuitry enables deletion of, from among information on the motion vectors stored in the memory, information on a motion vector in a region that will not be used in referencing performed in subsequent CTU processing.

This enables the decoder to reduce the amount of information to be stored in, for example, memory, by enabling deletion of information that will not be referenced in subsequent CTU processing.

For example, an encoding method according to one aspect of the present disclosure encodes a video and includes generating a motion vector predictor list by registering motion vector predictors obtained by referencing a plurality of encoded blocks, selects one motion vector predictor from the motion vector predictor list, and implements a prediction mode that performs motion compensation using a motion vector derived from the one motion vector predictor. The motion vector predictor list includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. The plurality of predetermined positions are defined by a regular interval using a top-left of a current picture as a reference point.

This enables the encoding method to achieve the same advantageous effects as the encoder described above.

For example, a decoding method according to one aspect of the present disclosure decodes a video and includes generating a motion vector predictor list by registering motion vector predictors obtained by referencing a plurality of decoded blocks, selects one motion vector predictor from the motion vector predictor list, and implements a prediction mode that performs motion compensation using a motion vector derived from the one motion vector predictor. The motion vector predictor list includes a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. The plurality of predetermined positions are defined by a regular interval using a top-left of a current picture as a reference point.

This enables the decoding method to achieve the same advantageous effects as the decoder described above.

Moreover, for example, the encoder according to one aspect of the present disclosure may include a splitter, an intra predictor, an inter predictor, a loop filter, a transformer, a quantizer, and an entropy encoder.

The splitter may split a picture into a plurality of blocks. The intra predictor may perform intra prediction on a block included in the plurality of blocks. The inter predictor may perform inter prediction on the block. The transformer may generate a transform coefficient by transforming the prediction error between a prediction image obtained by the intra prediction or inter prediction and the original image. The quantizer may generate a quantized coefficient by quantizing the transform coefficient. The entropy encoder may generate an encoded bitstream by encoding the quantized coefficient. The loop filter may apply a filter to a reconstructed image of the block.

Moreover, for example, the encoder may be an encoder that encodes a video including a plurality of pictures.

Then, the intra predictor may generate a motion vector predictor list by registering motion vector predictors obtained by referencing a plurality of encoded blocks, selects one motion vector predictor from the motion vector predictor list, and implements a prediction mode that performs motion compensation using a motion vector derived from the one motion vector predictor. The motion vector predictor list may include a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. Information on motion vectors to be referenced in the prediction mode may be managed in association with reference blocks of a specific size. The plurality of predetermined positions may be positions of, from among the reference blocks, reference blocks in positions defined by a regular interval using a current picture as a reference.

Moreover, for example, the decoder according to one aspect of the present disclosure may include an entropy decoder, an inverse quantizer, an inverse transformer, an intra predictor, an inter predictor, and a loop filter.

The entropy decoder may decode a quantized coefficient of a block in a picture from an encoded bitstream. The inverse quantizer may obtain a transform coefficient by inverse quantizing the quantized coefficient. The inverse transformer may obtain a prediction error by inverse transforming the transform coefficient. The intra predictor may perform intra prediction on the block. The inter predictor may perform inter prediction on the block. The filter may apply a filter to a reconstructed image generated using a prediction image obtained by the intra prediction or the inter prediction and the prediction error.

Moreover, for example, the decoder may be a decoder that decodes a video including a plurality of pictures.

Then, the intra predictor may generate a motion vector predictor list by registering motion vector predictors obtained by referencing a plurality of decoded blocks, selects one motion vector predictor from the motion vector predictor list, and implements a prediction mode that performs motion compensation using a motion vector derived from the one motion vector predictor. The motion vector predictor list may include a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. Information on motion vectors to be referenced in the prediction mode may be managed in association with reference blocks of a specific size. The plurality of predetermined positions may be positions of, from among the reference blocks, reference blocks in positions defined by a regular interval using a top-left of a current picture as a reference point.

Furthermore, these general and specific aspects may be implemented using a system, a device, a method, an integrated circuit, a computer program, or a non-transitory computer-readable recording medium such as a CD-ROM, or any combination thereof.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

Figure 1:
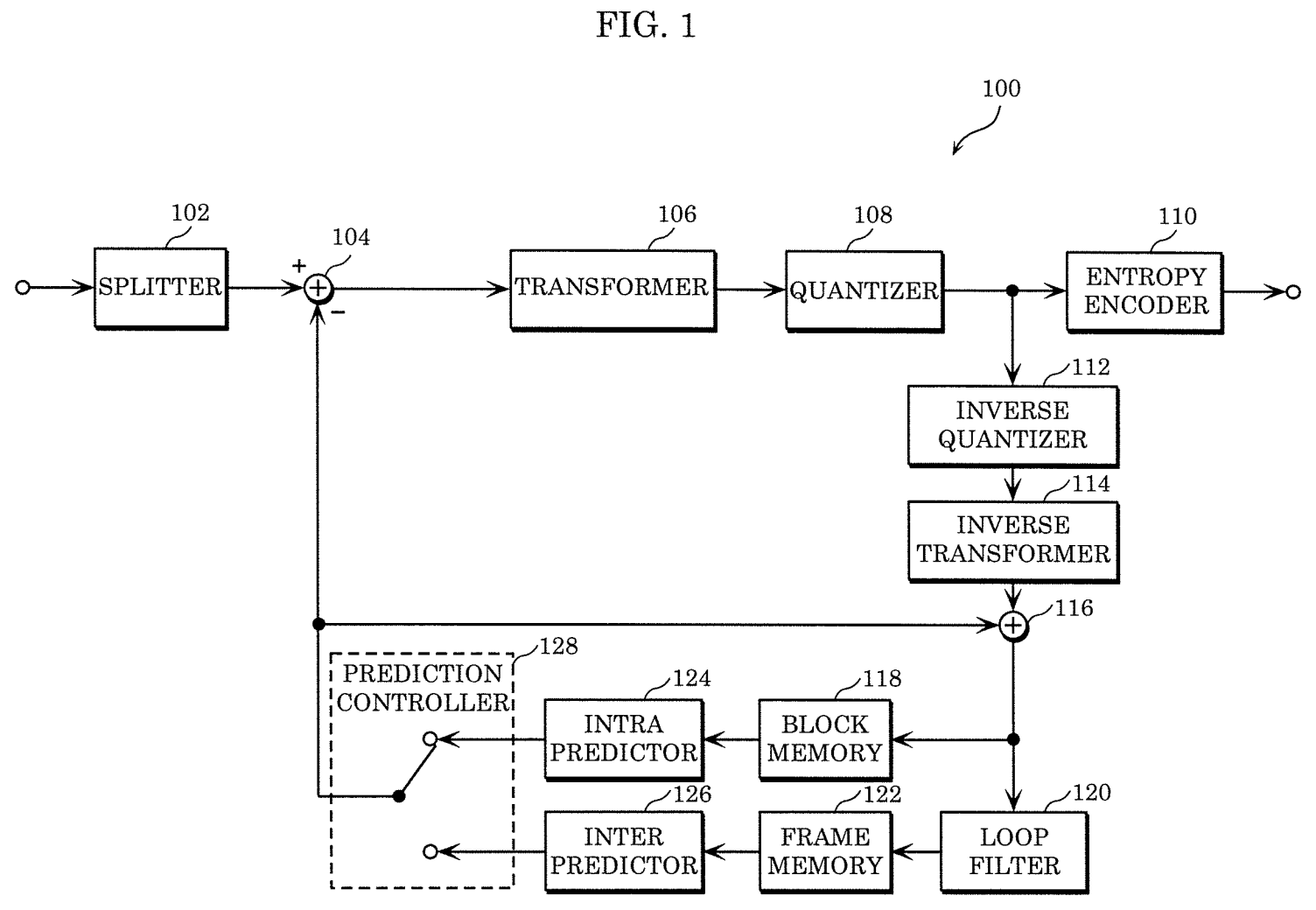

First, the encoder according to Embodiment 1 will be outlined. FIG. 1 is a block diagram illustrating a functional configuration of encoder 100 according to Embodiment 1.

Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
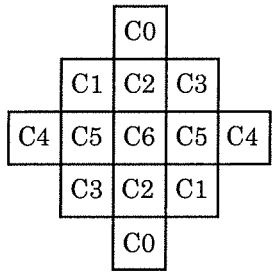
FIG. 4A illustrates one example of a filter shape used in ALF.
Figure 4B:
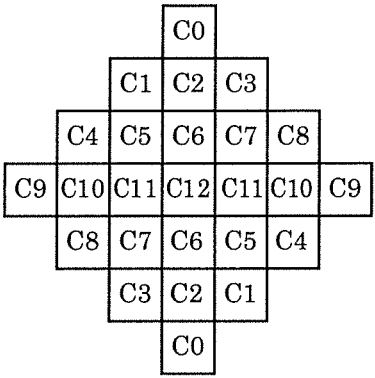
FIG. 4B illustrates another example of a filter shape used in ALF.
Figure 4C:
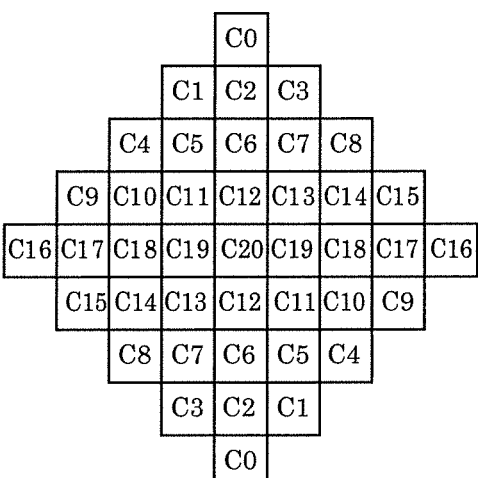
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level.

Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
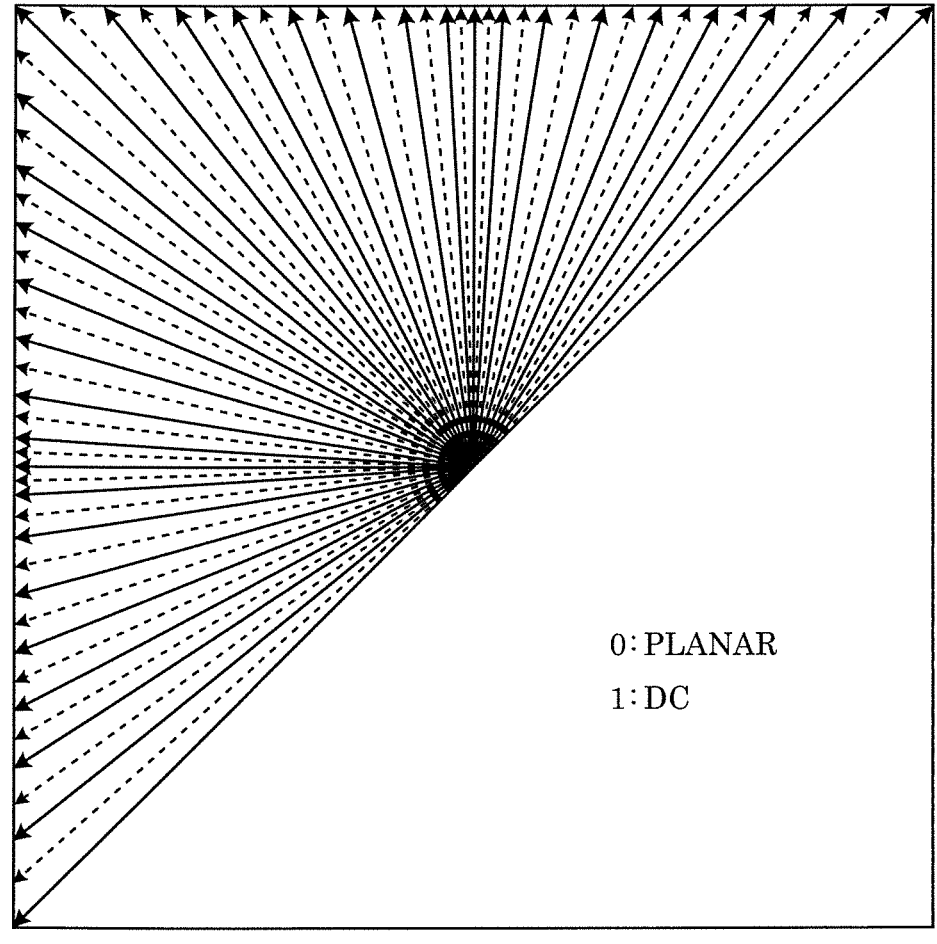
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
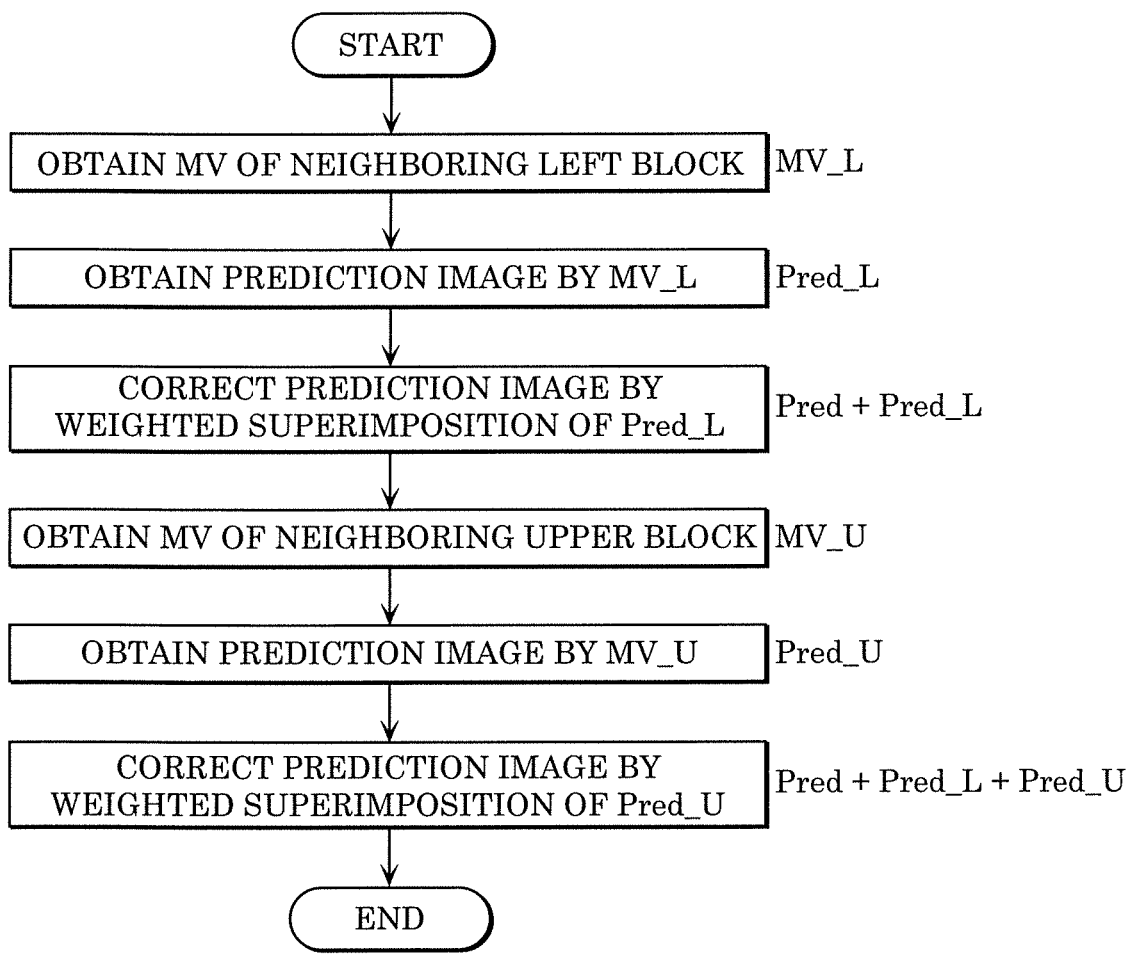
FIG. 5B is a flow chart for illustrating an outline of a prediction image correction process performed via OBMC processing.
Figure 5C:
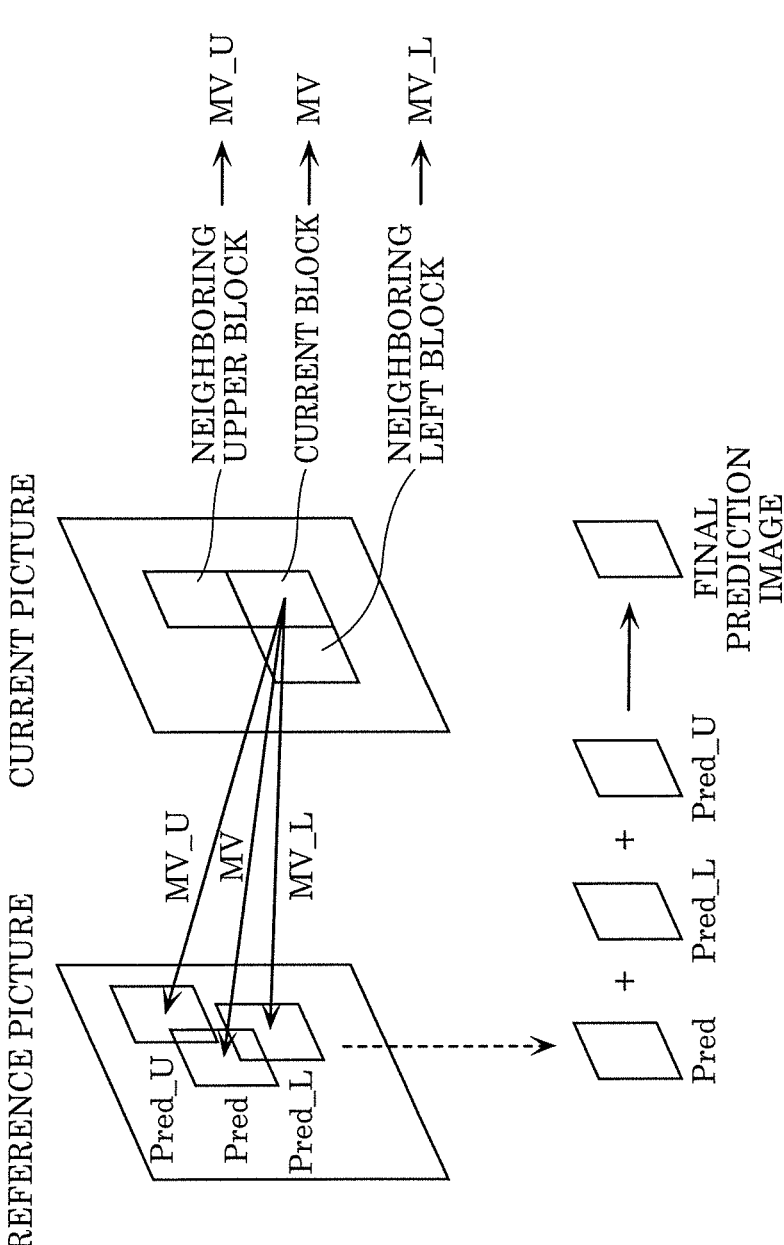
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further super-imposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
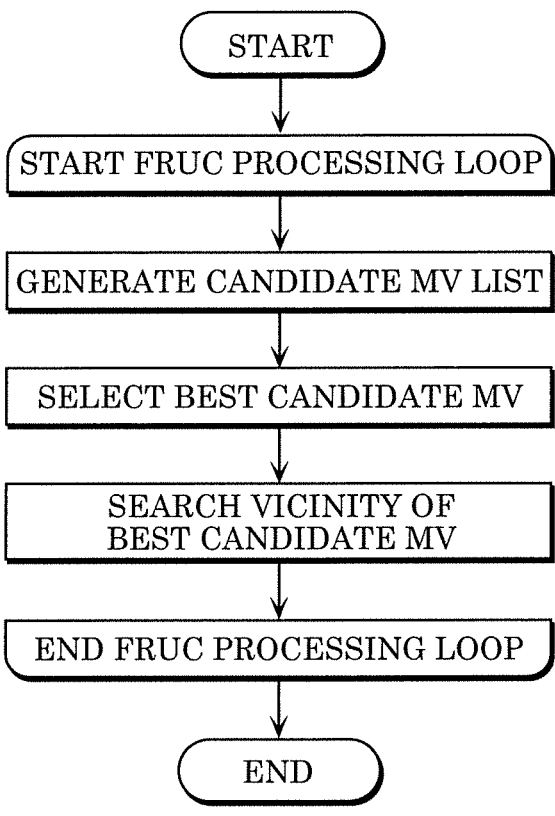
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
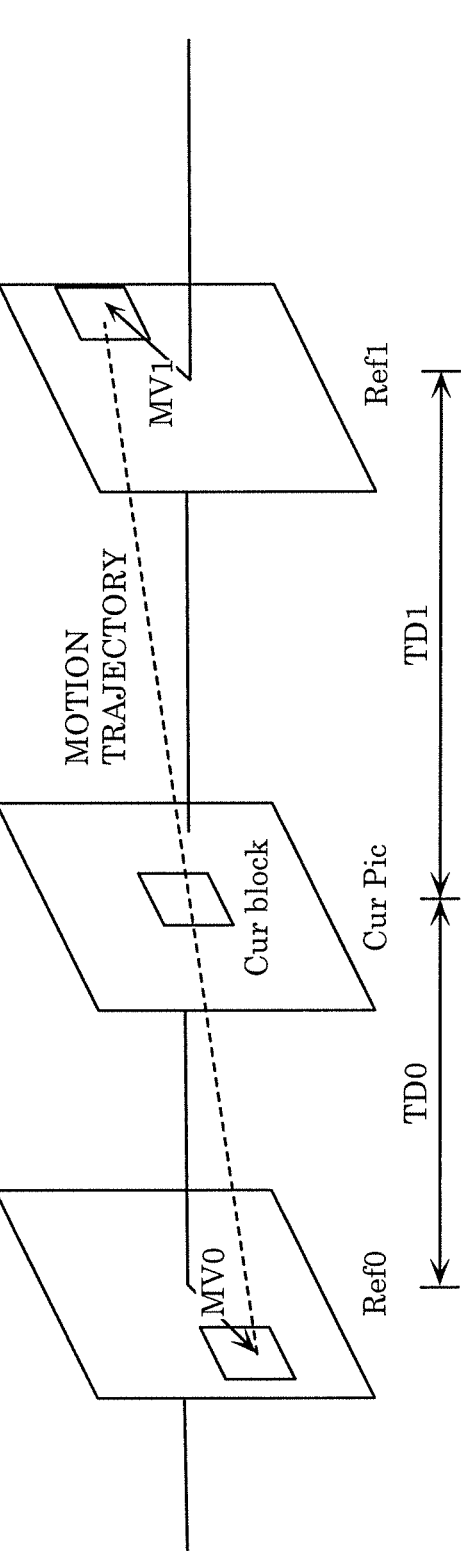
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
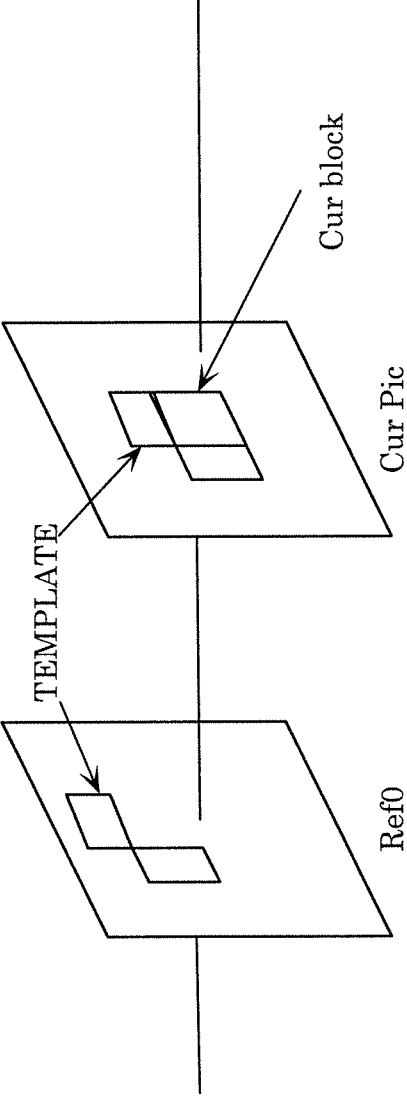
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
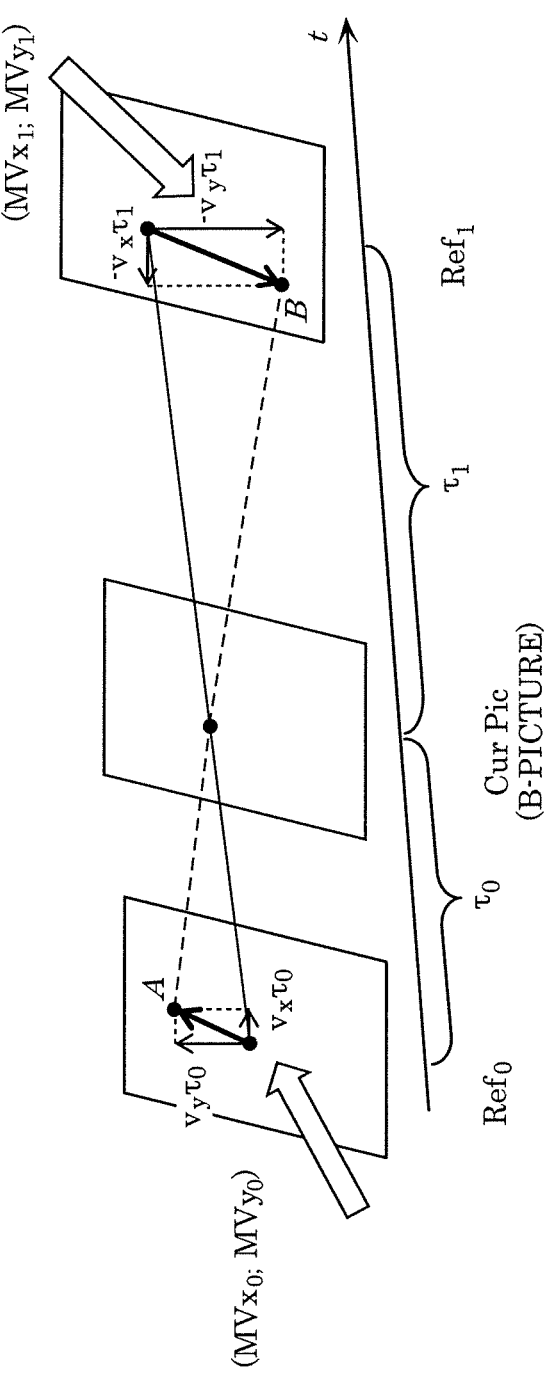
FIG. 8 is for illustrating a model assuming uniform linear motion.

FIG. 8 is for illustrating a model assuming uniform linear motion. In FIG. 8, $(v_x, v_y)$ denotes a velocity vector, and $T_0$ and $T_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x T_0, v_y T_0)$ and $(-v_x T_1, -v_y T_1)$, respectively, and the following optical flow equation is given.

MATH. 1

$$\partial I^{(k)}/\partial t + v_x \partial I^{(k)}/\partial x + v_y \partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
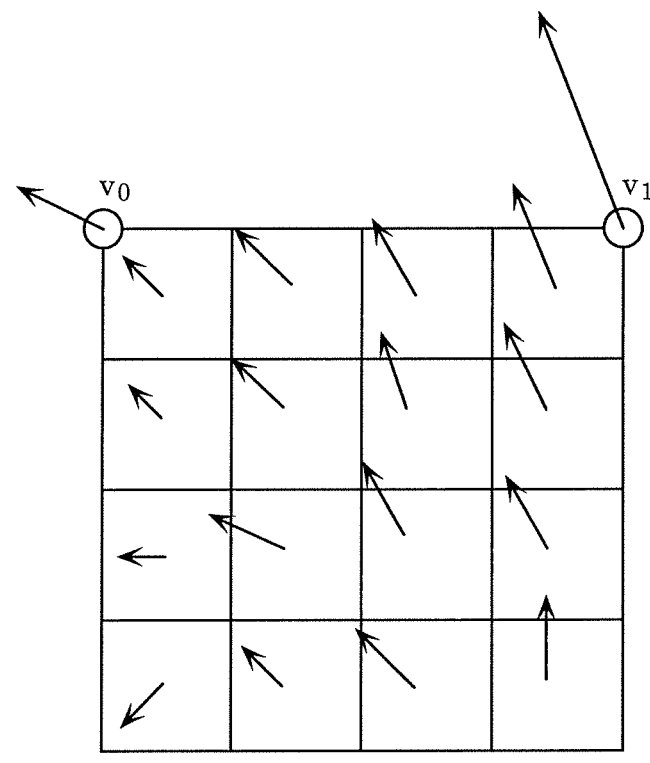
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

-continued $$\begin{cases} v_x = \dfrac{(v_{1x} - v_{0x})}{w}x - \dfrac{(v_{1y} - v_{0y})}{w}y + v_{0x} \\ \qquad\qquad (2) \\ v_y = \dfrac{(v_{1y} - v_{0y})}{w}x + \dfrac{(v_{1x} - v_{0x})}{w}y + v_{0y} \end{cases} \qquad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
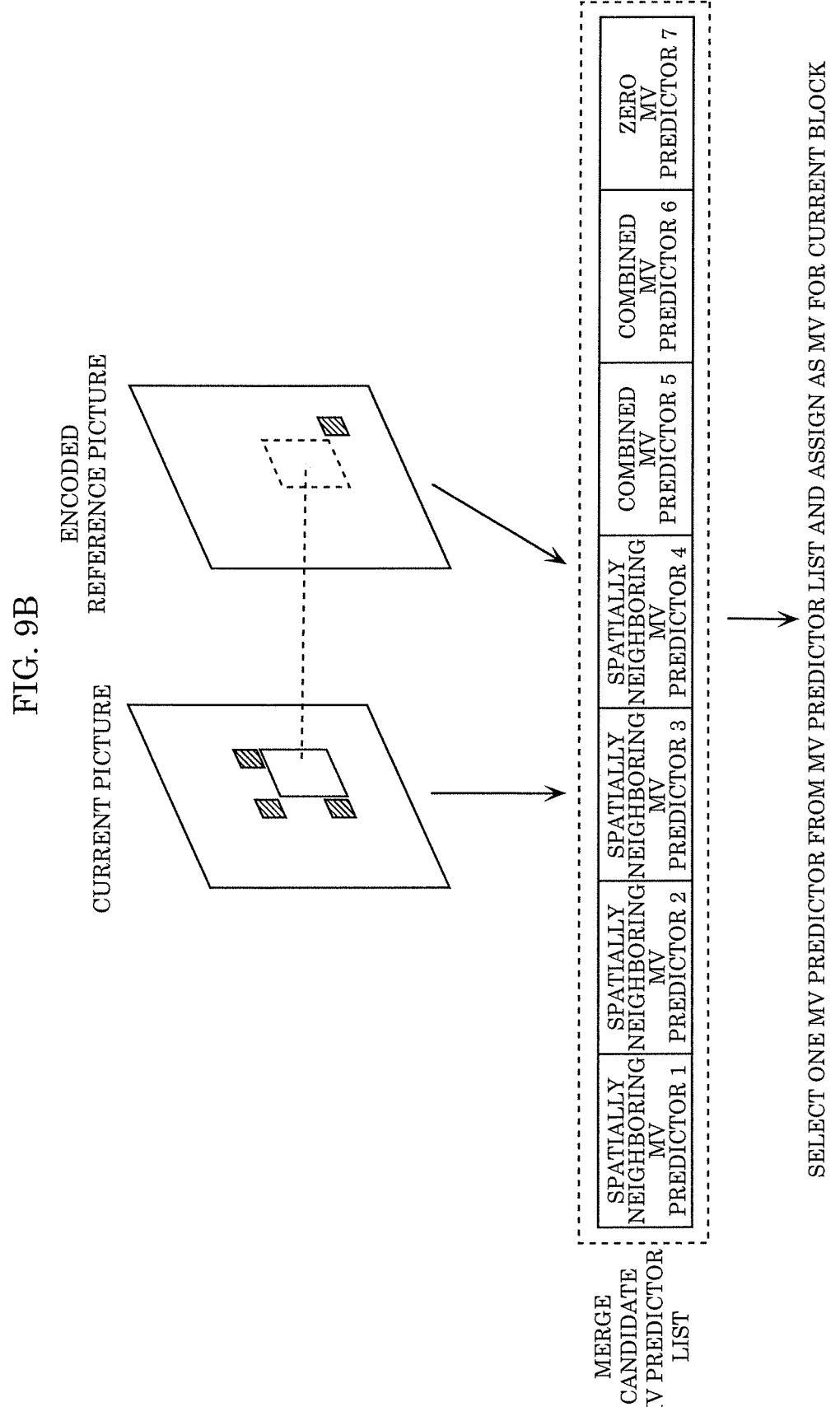
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
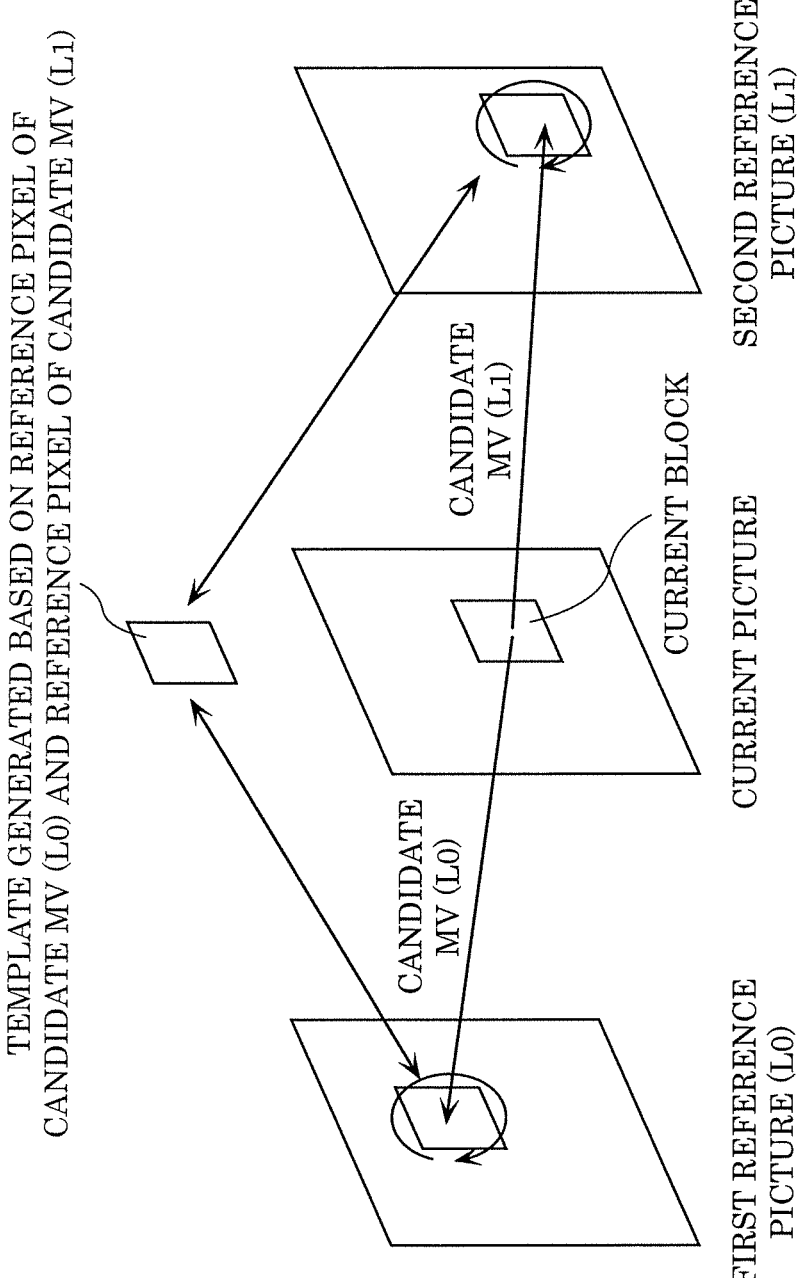
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
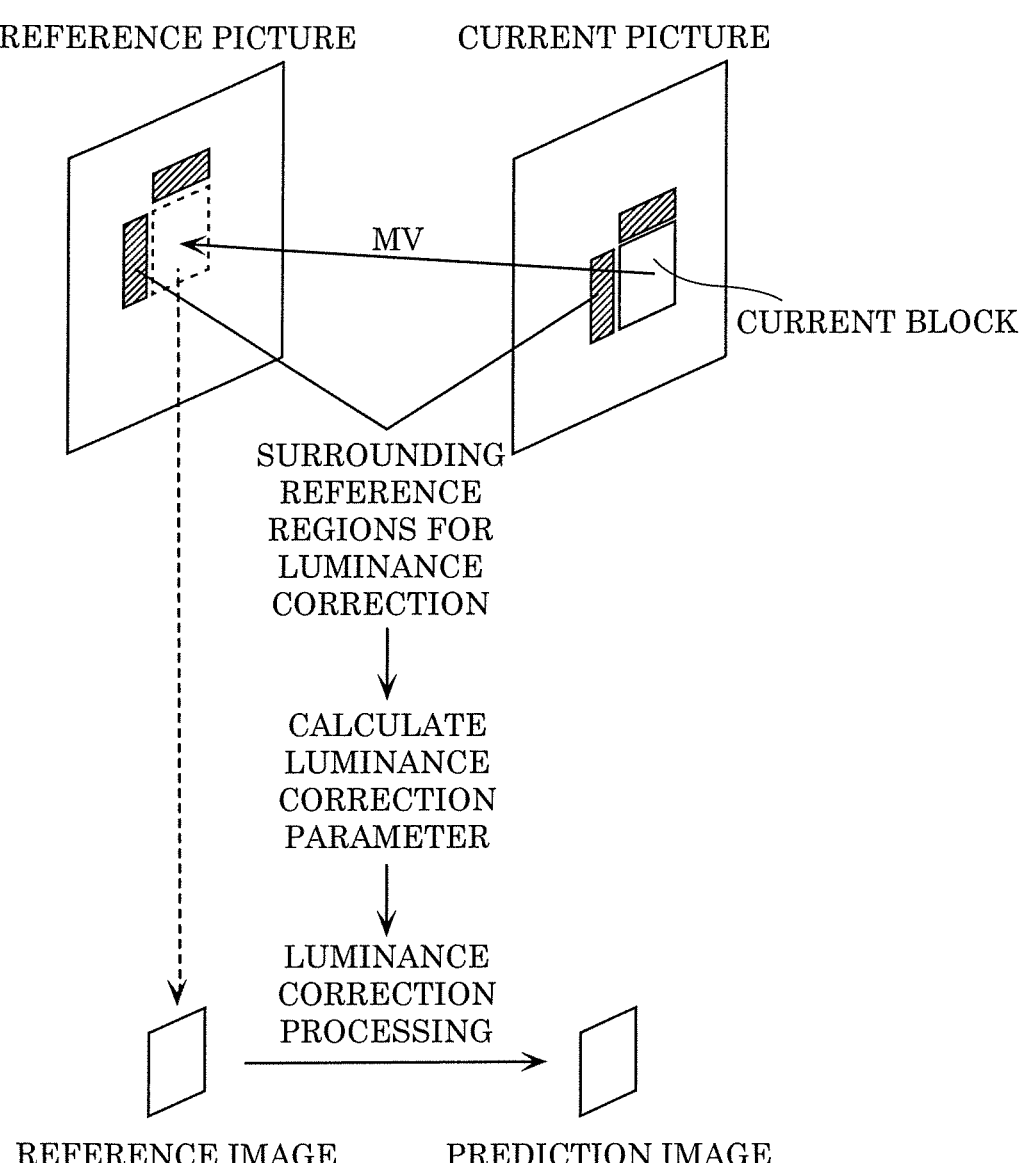
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
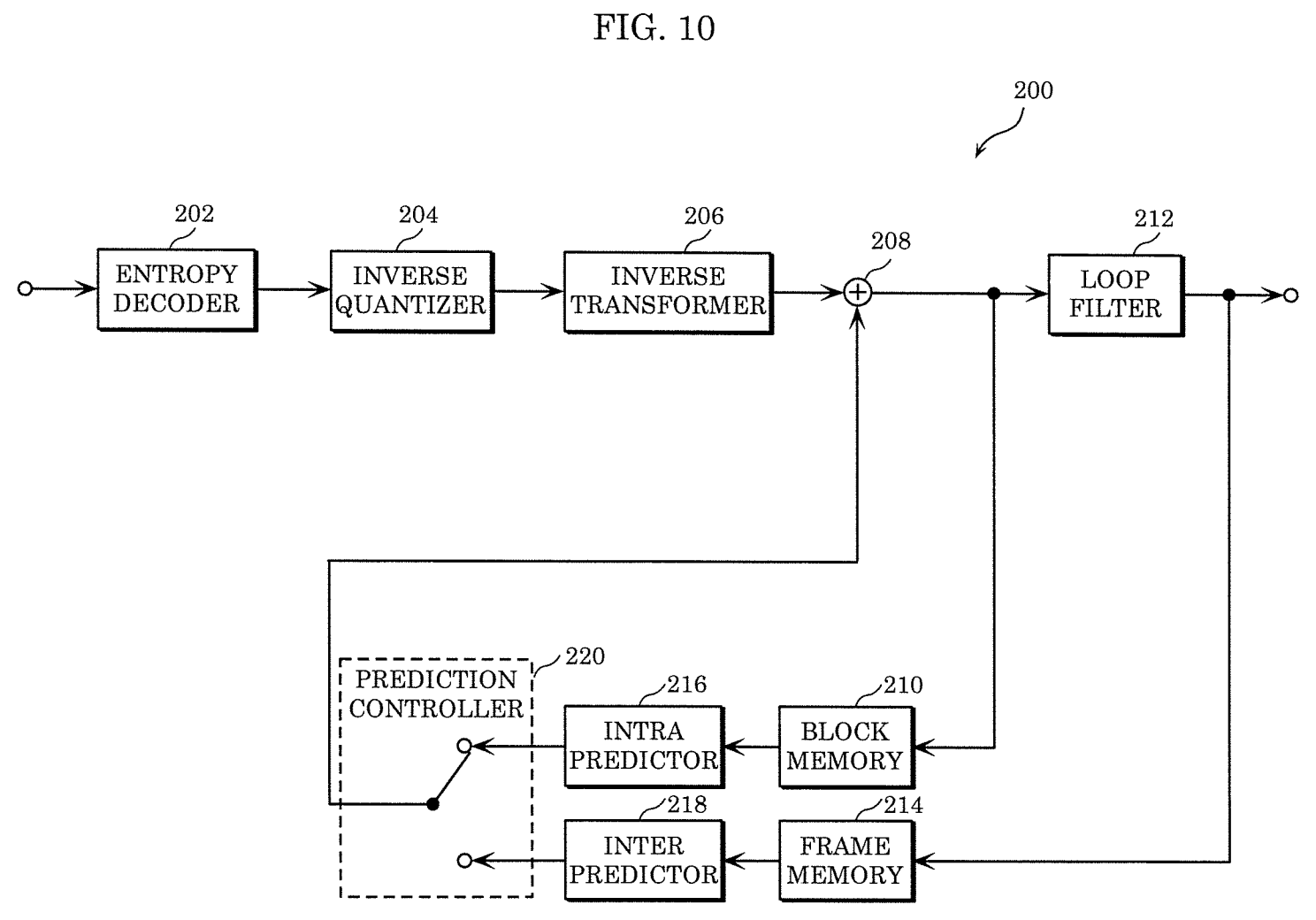

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Description of Another Merge Mode Method]

Figure 11:
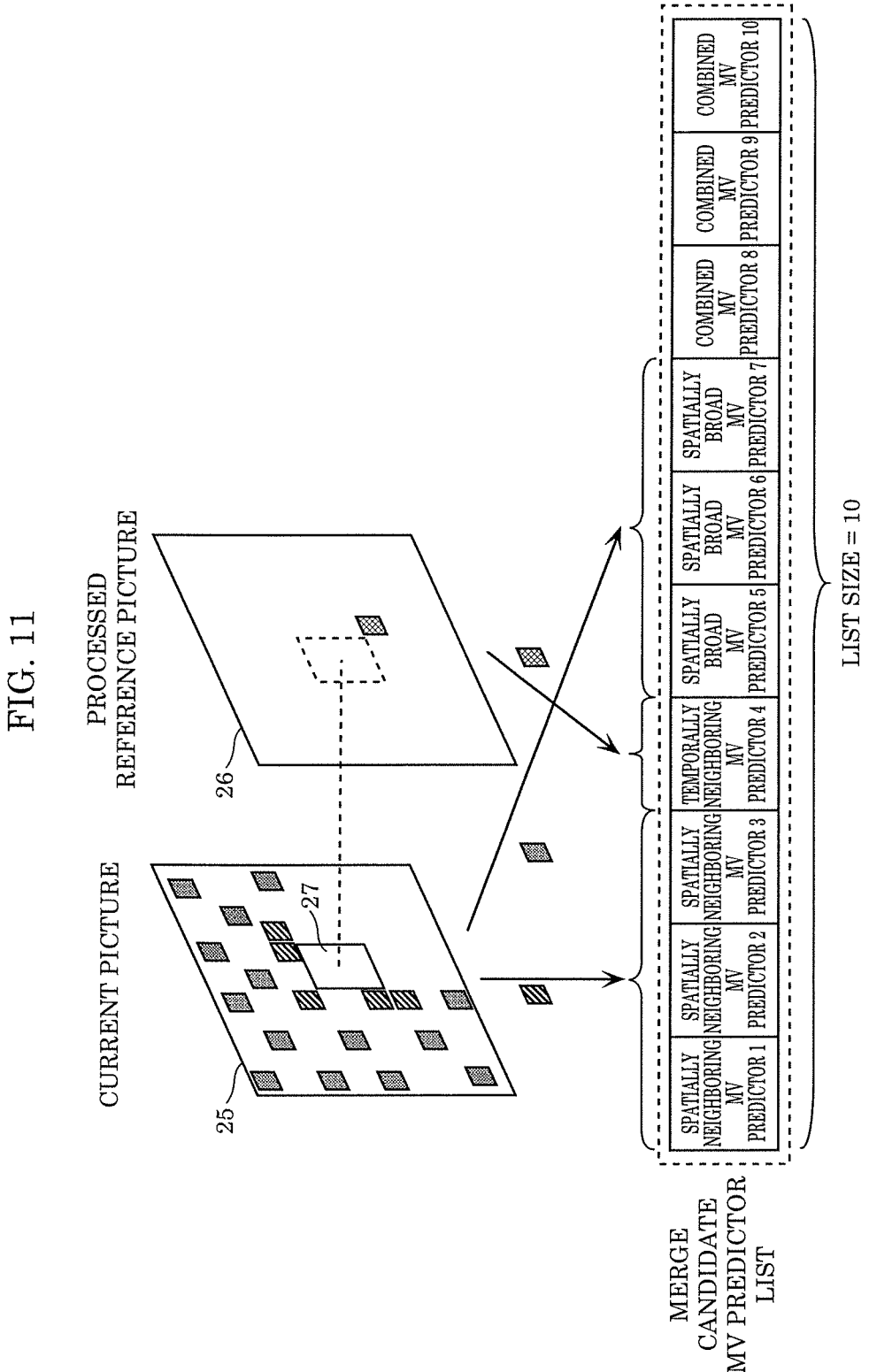
FIG. 11 illustrates a generation method of a motion vector predictor list in merge mode that uses spatially broad motion vector predictors according to Embodiment 1.

FIG. 11 illustrates a generation method of a motion vector predictor list in merge mode that uses spatially broad motion vector predictors according to Embodiment 1. Unlike the method illustrated in FIG. 9B, with the method illustrated in FIG. 11, encoder 100 does not merely register, in the motion vector predictor list, spatially neighboring motion vector predictors obtained from blocks that neighbor the current block. With the method illustrated in FIG. 11, encoder 100 obtains spatially broad motion vector predictors by also referencing blocks positioned in a range that is broader than the positions of blocks that neighbor the current block, and also registers the spatially broad motion vector predictors in the motion vector predictor list. As used herein, a motion vector predictor list is a list of motion vectors to be used in prediction, such as spatially neighboring motion vector predictors, registered by encoder 100 as motion vector predictors. Moreover, blocks referenced to obtain the spatially neighboring motion vector predictors and spatially broad motion vector predictors are processed blocks.

The size of the motion vector predictor list increases as the number of motion vectors that are motion vector predictor candidates for registration in the motion vector predictor list increases. For example, as illustrated in FIG. 11, the motion vector predictor list size is 10, which enables up to 10 motion vectors to be registered in the list.

As illustrated in FIG. 11, the blocks to be referenced for obtaining spatially broad vector predictors are those positioned in a range that is broader than the positions of blocks that neighbor the current block. Here, a range that is broader than the positions of the blocks that neighbor the current block is a range defined by a predetermined number of blocks based on the current block.

Encoder 100 then scans processed blocks positioned in the range that is broader than the positions of the blocks that neighbor the current block, in order of proximity to the current block. When encoder 100 is able to obtain a motion vector by scanning processed blocks, encoder 100 registers the value of the obtained motion vector into the motion vector predictor list as a spatially broad motion vector predictor. The values of motion vectors obtained by encoder 100 are registered in the motion vector predictor list by encoder 100 until a predetermined number of values is reached. For example, in the example illustrated in FIG. 11, the spatially broad motion vector predictors are registered in the motion vector predictor list after the temporally neighboring motion vector predictor. In the example illustrated in FIG. 11, three spatially broad motion vector predictors are registered in the motion vector predictor list.

As illustrated in FIG. 11, by enabling encoder 100 to reference blocks positioned in a range that is broader than the positions of blocks that neighbor the current block in the obtaining of motion vectors, encoder 100 can obtain more suitable motion vector predictors compared to a conventional configuration. This is because the number of motion vectors that can be selected for registration in the motion vector predictor list increase since the number of motion vectors subject to registration as motion vector predictors increases beyond a conventional configuration. With this, the possibility that the coding efficiency of encoder 100 can be improved increases.

On the other hand, enabling encoder 100 to reference blocks positioned in a range that is broader than the positions of blocks that neighbor the current block in the obtaining of motion vectors increases the amount of information to be stored in, for example, memory. This is because it is necessary to store information on the motion vectors of blocks that may potentially be referenced in, for example, memory. Since enabling encoder 100 to reference blocks positioned in a range that is broader than the positions of blocks that neighbor the current block in the obtaining of motion vectors increases the number of blocks that may potentially be referenced, the amount of information to be stored by encoder 100 in, for example, memory, increases.

For example, consider a case in which the position of the current block moves one reference block over to the right. Here, a reference block is a block of a specific size that is treated as a unit reference. The size of the reference block may be, for example, 4×4 pixels. First, encoder 100 stores, in, for example, memory, information held by each of blocks positioned in the range that is broader than the positions of the blocks that neighbor the current block, in order of proximity to the current block. Next, when the position of the current block has moved one reference block to the right, each of the blocks positioned in a range that is broader than the positions of blocks that neighbor the current block is also moved one block to the right. Thus, encoder 100 also must store, in, for example, memory, information held by each of blocks positioned in the range that is broader than the positions of the blocks that neighbor the current block that have been moved one reference block to the right. Thus, encoder 100 needs to store, in, for example, memory, information held by blocks positioned in a range that encompasses blocks that may potentially be referenced, as blocks positioned in the range that is broader than the positions of the blocks that neighbor the current block.

Note that the motion vector predictors registered in the motion vector predictor list described in FIG. 11 is merely one example. The number of motion vector predictors registered in the motion vector predictor list may be different from the number described in FIG. 11. Moreover, the types of motion vectors registered in the motion vector predictor list are not limited to the spatially neighboring motion vector predictor, the temporally neighboring motion vector predictor, the spatially broad motion vector predictor, the combined motion vector predictor, and the zero motion vector predictor described in FIG. 11. The types of motion vector predictors registered in the motion vector predictor list may omit one or more of the types of motion vector predictors described in FIG. 11. Additionally, the types of motion vector predictors registered in the motion vector predictor list may additionally include types that differ from those described in FIG. 11.

Moreover, the positions and number of blocks referenced for obtaining motion vector predictors described in FIG. 11 is merely one example; the positions and number of blocks may be different from the positions and number of blocks described in FIG. 11.

Moreover, the content described in FIG. 11 is described as applying to encoder 100, but the content may similarly apply to decoder 200.

[Merge Mode Process Flow Example]

Figure 12:
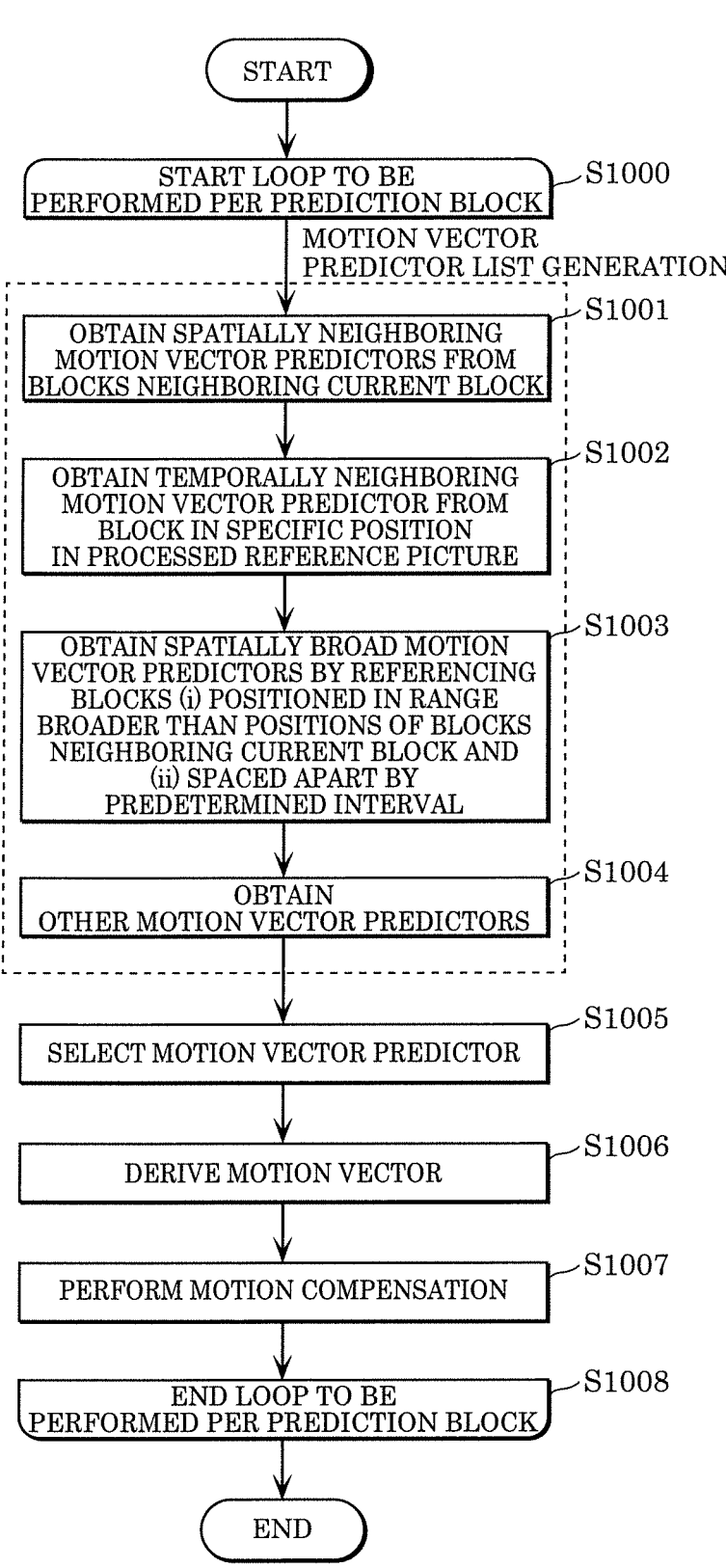
FIG. 12 is a flow chart showing processes performed in merge mode that uses spatially broad motion vector predictors according to Embodiment 1.

FIG. 12 is a flow chart showing processes performed in merge mode that uses spatially broad motion vector predictors according to Embodiment 1.

First, encoder 100 starts a loop that is performed per prediction block (step S1000).

Next, encoder 100 obtains spatially neighboring motion vector predictors from blocks that neighbor the current block in current picture 25 (step S1001).

Encoder 100 then obtains a temporally neighboring motion vector predictor from a block in a specific position in processed reference picture 26 (step S1002).

Next, encoder 100 obtains spatially broad motion vector predictors by referencing blocks (i) positioned in current picture 25 in a range that is broader than the positions of blocks that neighbor the current block and (ii) spaced apart by a predetermined interval (step S1003). Here, the predetermined interval may be determined using the top-left of current picture 25 as a reference point.

Encoder 100 then obtains motion vector predictors other than the motion vectors obtained in step S1001 through step S1003, such as combined motion vector predictors and zero motion vector predictors (step S1004). Encoder 100 registers the motion vector predictors obtained in step S1001 through step S1004 in the motion vector predictor list. The registration of motion vector predictors into the motion vector predictor list may be performed in each of step S1001 through step S1004, and may be performed collectively in, for example, step S1004.

Moreover, the motion vector predictors obtained by encoder 100 in step S1001 through step S1004 may be rearranged by encoder 100 in accordance with a specific condition, regardless of the order in which they were obtained. Moreover, the motion vector predictors obtained by encoder 100 in step S1001 through step S1004 may be, for example, combined, removed, or added by encoder 100, regardless of the order in which they were obtained, and encoder 100 may reconfigure the motion vector predictor list accordingly.

Note that the motion vector predictors described in step S1001 through step S1004 are merely one example; one or more of the motion vector predictors described in step S1001 through step S1004 may be omitted from the motion vector predictors obtained by encoder 100. Moreover, the motion vector predictors obtained by encoder 100 may additionally include types of motion vector predictors other than those described in step S1001 through step S1004. Moreover, the motion vector predictors obtained by encoder 100 need not be registered in the motion vector predictor list in the order described in step S1001 through step S1004; the motion vector predictors may be registered in the motion vector predictor list in an order different from the order described in step S1001 through step S1004.

Next, encoder 100 selects a motion vector predictor to be assigned to the current block in current picture 25 from among the obtained motion vector predictors (step S1005). Encoder 100 may select a motion vector predictor to be used in prediction from the motion vector predictors registered in the motion vector predictor list. Moreover, at this time, encoder 100 writes information indicating the selected motion vector predictor into the bitstream, and encodes it.

For example, encoder 100 uses the following method to select the motion vector predictor to be assigned to the current block. Encoder 100 calculates the differences between provisional prediction images generated using motion vector predictors and input images to be processed. The encoder calculates evaluation values by calculating the differences, and selects a motion vector predictor candidate determined to have the highest evaluation value as the motion vector predictor. On the other hand, decoder 200 decodes information indicating the motion vector predictor selected by encoder 100 to select the motion vector predictor to be assigned to the current block from among the plurality of motion vector predictor candidates registered in the motion vector predictor list.

Next, encoder 100 derives a motion vector to be used in motion compensation (MC), from the selected motion vector predictor (step S1006). For example, encoder 100 use the selected motion vector predictor as the motion vector. Moreover, for example, encoder 100 may perform, on an area in the vicinity of the selected motion vector predictor, a search process using a reconstructed image of a processed area to update the motion vector predictor, and then use the updated motion vector predictor as the motion vector.

Next, encoder 100 generates a prediction image by performing motion compensation (step S1007).

Encoder 100 then ends the loop that is performed per prediction block (step S1008). Here, encoder 100 concludes operations.

Note that the processes and flow of processes described in FIG. 12 are merely one example; one or more of the processes described in FIG. 12 may be omitted, a process not described in FIG. 12 may be added, and the order of processes described in FIG. 12 may be rearranged.

Moreover, decoder 200 may perform the operations from step S1000 to step S1008 described in FIG. 12 by switching encoding with decoding. Note that the operation described as "encoded in the bitstream" in the encoding can be replaced with "decoded from the bitstream" in the decoding.

Figure 13:
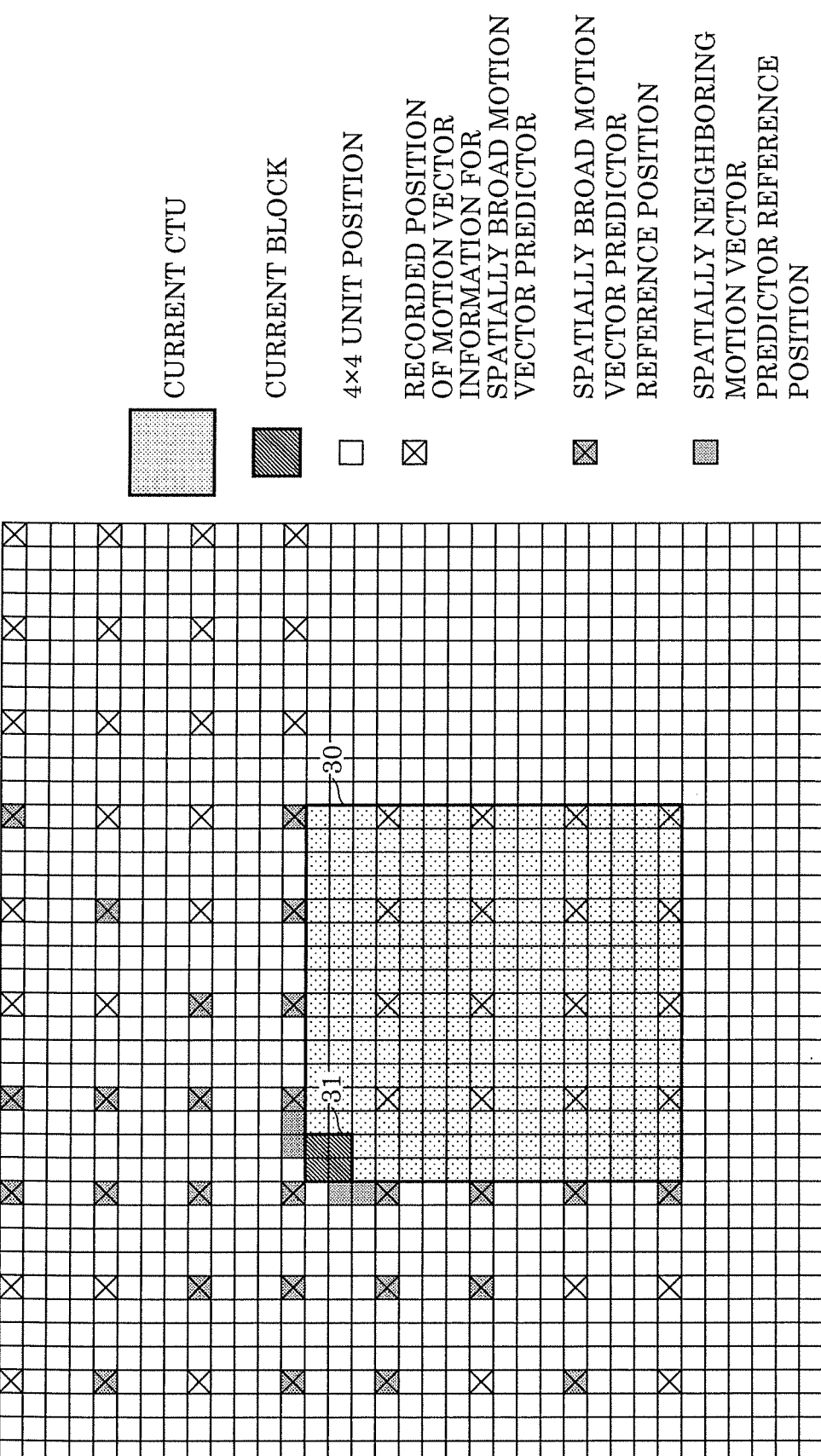
FIG. 13 illustrates a first method of referencing spatially broad vectors in merge mode that uses spatially broad motion vector predictors according to Embodiment 1.

FIG. 13 illustrates a first method of referencing spatially broad vectors in merge mode that uses spatially broad motion vector predictors according to Embodiment 1. In FIG. 13, the operations performed in step S1003 described in FIG. 12 are explained in detail.

In the example illustrated in FIG. 13, the 8×8 pixel current block 31 is positioned in the most top-left position in current CTU (Coding Tree Unit) 30. FIG. 13 shows the positions of reference blocks to be referenced upon processing current block 31 positioned in the most top-left position in current CTU 30. This referencing is performed by the encoder in order for encoder 100 to obtain spatially neighboring motion vector predictors and spatially broad motion vector predictors. Moreover, the motion vector predictors to be referenced are defined per 4×4 pixel reference block, which is the smallest prediction block unit.

Like the example described in FIG. 11, encoder 100 obtains spatially neighboring motion vector predictors by referencing, on a per reference block basis, processed blocks that spatially neighbor current block 31. In FIG. 13, processed blocks that spatially neighbor current block 31 are illustrated as hatched blocks. On the other hand, encoder 100 obtains spatially broad motion vector predictors by referencing blocks (i) positioned in a range that is broader than the positions of blocks that neighbor current block 31 and (ii) spaced apart by a predetermined interval. As illustrated in FIG. 13, blocks marked with an X indicate the blocks (i) positioned in a range that is broader than the positions of blocks that neighbor current block 31 and (ii) spaced apart by a predetermined interval. The predetermined interval is four reference blocks in the horizontal direction and four reference blocks in the vertical direction. In other words, the predetermined interval is 16 pixels in the horizontal direction and 16 pixels in the vertical direction.

Each block that is marked with an X and hatched is, from among processed blocks (i) positioned in a range that is broader than the positions of blocks that neighbor current block 31 and (ii) spaced apart by a predetermined interval, a block that meets the following conditions: (1) is positioned outside of current block 31, and (2) is one of four sequential reference blocks in any one of the down, left-down, left, left-up, up, right-up, and right directions, from at least one of reference blocks that are closest to current block 31 from among reference blocks that are spaced apart by the predetermined interval and cover the top and left sides of current block 31. In other words, each block that is marked with an X and hatched indicates, from among processed blocks (i) positioned in a range that is broader than the positions of blocks that neighbor current block 31 and (ii) spaced apart by the predetermined interval, a block that is positioned outside of the current block and within a range spreading radially outward, up to four of the above blocks, from a position of a closest one of blocks that surround the left and top sides of current block 31.

The range of blocks that are marked with an X and hatched may be adaptively switched based on the capability of the encoder or the size of the current picture. Moreover, the predetermined interval between blocks that are marked with an X and hatched may be adaptively switched based on the capability of the encoder or the size of the current picture.

Encoder 100 then scans the blocks marked with an X and hatched in FIG. 13 in order of proximity to current block 31, and obtains the motion vector values from the scanned blocks. Encoder 100 registers the values of the obtained motion vectors into the motion vector predictor list as spatially broad motion vector predictors, until a specific number is reached.

FIG. 14 illustrates a second method of referencing spatially broad vectors in merge mode that uses spatially broad motion vector predictors according to Embodiment 1. FIG. 14 illustrates positions of reference blocks for obtaining spatially neighboring motion vector predictors and spatially broad motion vector predictors when current block 31*a* is in a different position than current block 31 illustrated in FIG. 13. Specifically, current block 31*a* is an 8×16 pixel region that is positioned in the central upper area of current CTU 30.

Like with the method described in FIG. 13, encoder 100 obtains spatially neighboring motion vector predictors by referencing processed blocks that spatially neighbor current block 31*a*. The processed blocks that spatially neighbor current block 31*a*, which are to be referenced by encoder 100, are, for example, the reference blocks indicated as hatched blocks in FIG. 14.

Moreover, like with the method described in FIG. 13, encoder 100 obtains spatially broad motion vector predictors by referencing processed blocks (i) positioned in a range that is broader than the positions of blocks that neighbor current block 31*a* and (ii) spaced apart by a predetermined interval. In FIG. 14, among processed blocks (i) positioned in a range that is broader than the positions of blocks that neighbor current block 31*a* and (ii) spaced apart by a predetermined interval, the blocks to be referenced by encoder 100 are the blocks that are marked with an X and hatched. Each block that is marked with an X and hatched is, from among processed blocks (i) positioned in a range that is broader than the positions of blocks that neighbor current block 31*a* and (ii) spaced apart by a predetermined interval, a block that meets the following conditions: (1) is positioned outside of current block 31*a*, and (2) is one of four sequential reference blocks in any one of the down, left-down, left, left-up, up, right-up, and right directions, from at least one of reference blocks that are closest to current block 31*a* from among reference blocks that are spaced apart by the predetermined interval and cover the top and left sides of current block 31*a*. In other words, each block that is marked with an X and hatched indicates, from among processed blocks (i) positioned in a range that is broader than the positions of blocks that neighbor current block 31*a* and (ii) spaced apart by the predetermined interval, a block that is positioned outside of the current block and within a range spreading radially outward, up to four of the above blocks, from a position of a closest one of blocks that surround the left and top sides of current block 31*a*.

Encoder 100 then scans the blocks marked with an X and hatched in FIG. 14 in order of proximity to current block 31*a*, and obtains the motion vector values from the scanned blocks. Encoder 100 registers the values of the obtained motion vectors into the motion vector predictor list as spatially broad motion vector predictors, until a specific number is reached. Moreover, the blocks are reference blocks. Note that the predetermined interval is four reference blocks in the horizontal direction and four reference blocks in the vertical direction. In other words, the predetermined interval is 16 pixels in the horizontal direction and 16 pixels in the vertical direction.

Note that among the blocks that are marked with an X, hatched, and positioned in the current CTU, those that come after current block 31*a* in processing order by encoder 100 cannot be referenced by encoder 100 for the obtaining of a motion vector predictor. This is because the motion vectors of blocks that come after current block 31*a* in processing order by encoder 100 are undefined at the point in time that encoder 100 processes current block 31*a*.

The positions of blocks marked with an X and hatched in the example illustrated in FIG. 14 have moved from the example illustrated in FIG. 13. However, blocks marked with an X and hatched in FIG. 14 have not moved to positions other than blocks marked with an X in FIG. 13. In other words, regardless of the position and size of the current block, in both FIG. 13 and FIG. 14, reference blocks, which are blocks marked with an X, are referenced by encoder 100.

In the example described in FIG. 11, since blocks positioned in a range that is broader than the range of positions of blocks that neighbor current block 27 are referenced based on their relative position to current block 27, taking into consideration the sequential movement of the position of the current block, there is a possibility that the motion vectors for all block positions will be referenced. Accordingly, encoder 100 must store, in, for example, memory, information on the motion vectors for all block positions. However, with the method according to the present embodiment described in FIG. 13 and FIG. 14, since processed blocks that are spaced apart by a predetermined interval are referenced, it is sufficient if encoder 100 stores, in, for example, memory, the information for blocks in limited positions. Accordingly, encoder 100 can reduce the amount of information to be stored, which makes it possible to significantly reduce the capacity of, for example, memory. As such, encoder 100 allows for a reduction in the scale of the circuitry included in encoder 100.

Figure 15:
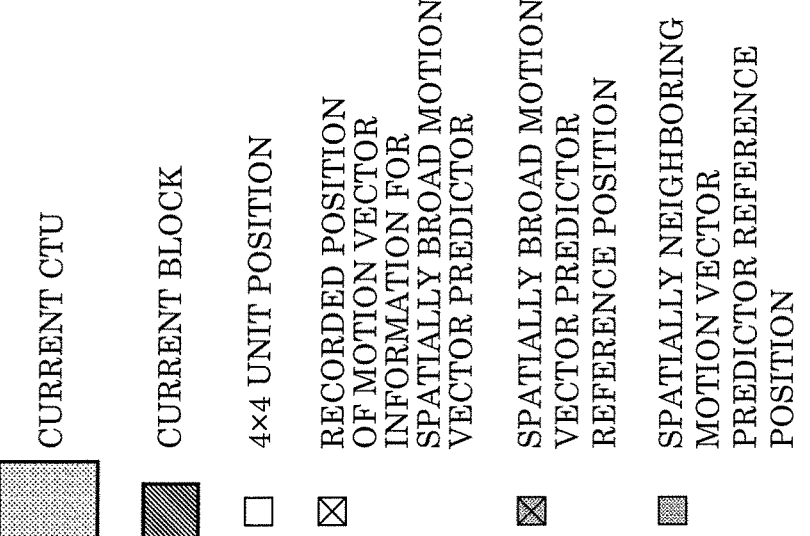
FIG. 15 illustrates a third method of referencing spatially broad vectors in merge mode that uses spatially broad motion vector predictors according to Embodiment 1.

FIG. 15 illustrates a third method of referencing spatially broad vectors in merge mode that uses spatially broad motion vector predictors according to Embodiment 1. FIG. 15 illustrates positions of reference blocks for obtaining spatially neighboring motion vector predictors and spatially broad motion vector predictors when current block 31*b* is in a different position than current block 31 illustrated in FIG. 13 and current block 31*a* illustrated in FIG. 14. Specifically, current block 31*b* is a 32×32 pixel region that is positioned in the bottom-right vicinity of current CTU 30.

Like with the methods described in FIG. 13 and FIG. 14, encoder 100 obtains spatially neighboring motion vector predictors by referencing processed blocks that spatially neighbor current block 31*b*. The processed blocks that spatially neighbor current block 31*b*, which are to be referenced by encoder 100, are, for example, the reference blocks indicated as hatched blocks in FIG. 15.

Moreover, like with the methods described in FIG. 13 and FIG. 14, encoder 100 obtains spatially broad motion vector predictors by referencing processed blocks (i) positioned in a range that is broader than the positions of blocks that neighbor current block 31*b* and (ii) spaced apart by a predetermined interval. In FIG. 15, among processed blocks (i) positioned in a range that is broader than the positions of blocks that neighbor current block 31*b* and (ii) spaced apart by a predetermined interval, the blocks to be referenced by encoder 100 are the blocks that are marked with an X and hatched. Each block that is marked with an X and hatched is, from among processed blocks (i) positioned in a range that is broader than the positions of blocks that neighbor current block 31*b* and (ii) spaced apart by a predetermined interval, a block that meets the following conditions: (1) is positioned outside of current block 31*b*, and (2) is one of four sequential reference blocks in any one of the down, left-down, left, left-up, up, right-up, and right directions, from at least one of reference blocks that are closest to current block 31*b* from among reference blocks that are spaced apart by the predetermined interval and cover the top and left sides of current block 31*b*. In other words, each block that is marked with an X and hatched indicates, from among processed blocks (i) positioned in a range that is broader than the positions of blocks that neighbor current block 31*b* and (ii) spaced apart by the predetermined interval, a block that is positioned outside of the current block and within a range spreading radially outward, up to four of the above blocks, from a position of a closest one of blocks that surround the left and top sides of current block 31*b*.

Encoder 100 then scans the blocks marked with an X and hatched in FIG. 15 in order of proximity to current block 31*b*, and obtains the motion vector values from the scanned blocks. Encoder 100 registers the values of the obtained motion vectors into the motion vector predictor list as spatially broad motion vector predictors, until a specific number is reached. Moreover, the blocks are reference blocks. Note that the predetermined interval is four reference blocks in the horizontal direction and four reference blocks in the vertical direction. In other words, the predetermined interval is 16 pixels in the horizontal direction and 16 pixels in the vertical direction.

Since current block 31*b* is larger than current block 31 and current block 31*a*, the method described in FIG. 15 differs from the methods described in FIG. 13 and FIG. 14 in that only a portion of the blocks marked with an X are allowed to be referenced. Specifically, rather than allowing all of the blocks marked with an X that are on the left and top sides of current block 31*b* to be referenced, only a portion of the blocks marked with an X that are on the left and top sides of current block 31*b* are allowed to be referenced. For example, the sequences of blocks to be referenced that extend left of current block 31*b* are limited to three sequences, the sequences of blocks to be referenced that extend upward of current block 31*b* are limited to three sequences, and sequences of blocks other than the sequences of blocks selected as reference candidates by encoder 100 are not referenced by encoder 100.

This prevents increases and decreases in the number of reference candidate blocks, depending on the size of the current block. In particular, this prevents, for example, an extreme increase in the number of reference candidate blocks, depending on the size of the current block. As such, encoder 100 allows for the homogenization of processing amount and the scale of the circuitry included in encoder 100.

Note that the predetermined interval illustrated in FIG. 13, FIG. 14, and FIG. 15 is merely one example. The predetermined interval is exemplified as four reference blocks, but the number of reference blocks that define the predetermined interval is not limited to four. The number of reference blocks that define the predetermined interval may be some other number. Moreover, the predetermined interval need not necessarily be defined by a number of reference blocks or pixels. The predetermined interval may be defined by some method other than a method using a number of reference blocks or pixels.

Note that the method of selecting blocks marked with an X and hatched in FIG. 13, FIG. 14, and FIG. 15 is merely one example. The method of selecting blocks marked with an X and hatched is not limited to the method illustrated in FIG. 13, FIG. 14, and FIG. 15; blocks marked with an X and hatched may be selected using a method other than the method illustrated in FIG. 13, FIG. 14, and FIG. 15.

Note that in FIG. 13, FIG. 14, and FIG. 15, blocks neighboring the top-left of current block 31 are neighboring blocks of current block 31, but may be selected by encoder 100 as blocks to be referenced to obtain spatially broad motion vector predictors.

Moreover, decoder 200 may perform the content described in FIG. 13 through FIG. 15 by switching encoding with decoding. Note that the operation described as "encoded in the bitstream" in the encoding can be replaced with "decoded from the bitstream" in the decoding.

Figure 16:
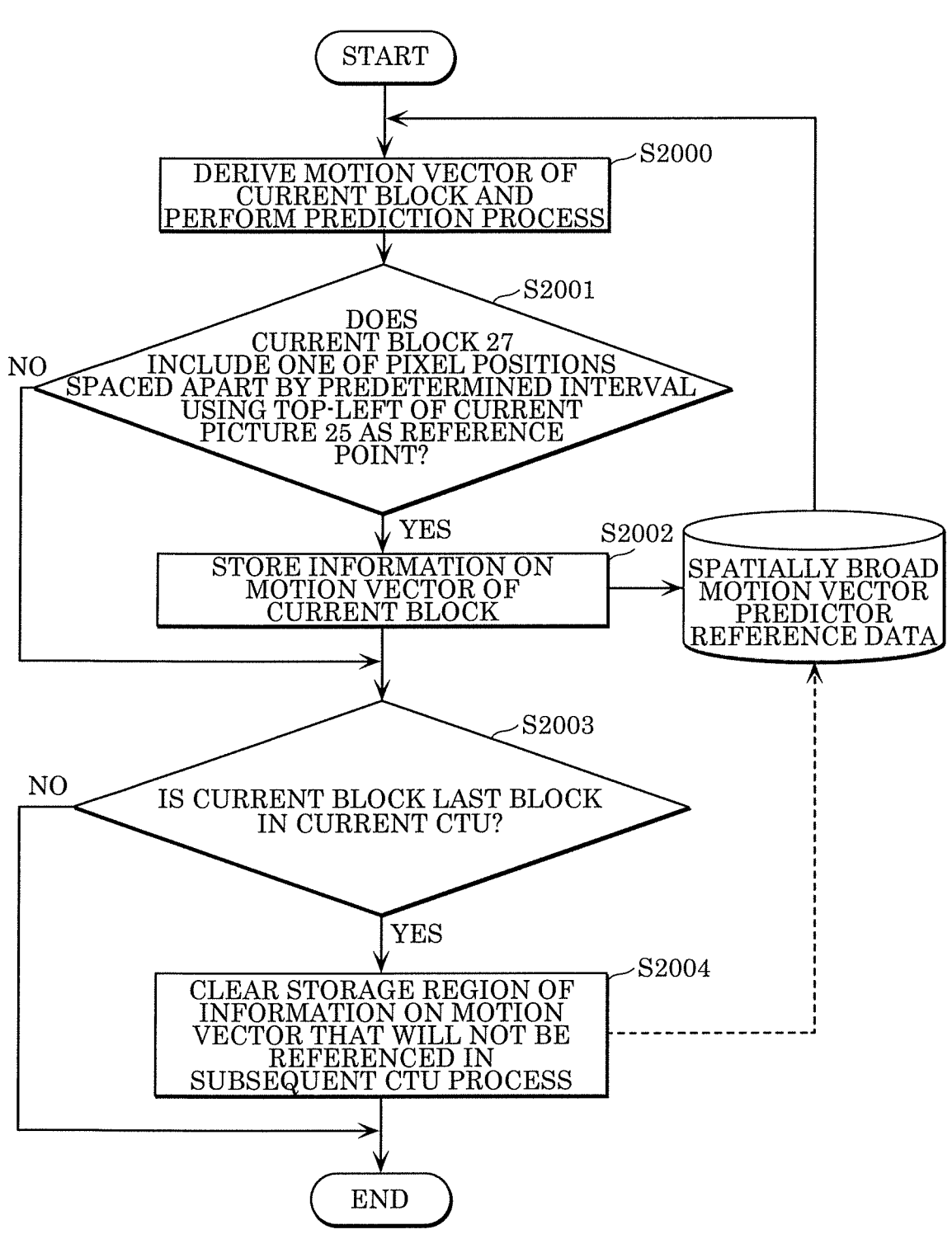
FIG. 16 is a flow chart showing a management method for memory, etc., that stores motion vectors for referencing spatially broad motion vector predictors according to an embodiment.

FIG. 16 is a flow chart showing a management method for memory, etc., that stores motion vectors for referencing spatially broad motion vector predictors according to an embodiment. The management method described in FIG. 16 applies to both encoder 100 and decoder 200.

Information on motion vectors for referencing spatially broad motion vector predictors described in FIG. 12 through FIG. 15 is stored in memory, etc., in encoder 100 or decoder 200.

Hereinafter, the flow of processes performed in encoder 100 will be described.

First, encoder 100 derives the motion vector of current block 27, and performs a prediction process (step S2000). Encoder 100 may read information on the motion vector stored in, for example, memory, to derive the motion vector of current block 27 and perform a prediction process.

Next, encoder 100 determines whether current block 27 includes one of pixel positions spaced apart by a predetermined interval using the top-left of current picture 25 as a reference point (step S2001). Pixel positions spaced apart by a predetermined interval using the top-left of current picture 25 as a reference point correspond to the blocks marked with an X in FIG. 13 through FIG. 15.

When encoder 100 determines that current block 27 includes one of pixel positions spaced apart by a predetermined interval using the top-left of current picture 25 as a reference point (yes in step S2001), encoder 100 stores, in, for example, memory, motion vector information on current block 27 (step S2002).

When encoder 100 determines that current block 27 does not include one of pixel positions spaced apart by a predetermined interval using the top-left of current picture 25 as a reference point (no in step S2001), encoder 100 does not store, in, for example, memory, motion vector information on current block 27.

Next, encoder 100 determines whether current block 27 is the last block in the current CTU (step S2003).

When encoder 100 determines that current block 27 is the last block in the current CTU (yes in step S2003), encoder 100 clears the memory region in which information on the motion vectors at positions of blocks that will not be referenced in subsequent CTU processing, from among information on motion vectors for referencing spatially broad motion vector predictors that is stored in, for example, memory (step S2004). In other words, from among information stored in, for example, memory, on motion vectors for referencing spatially broad motion vector predictors, encoder 100 deletes information on motion vectors at positions of blocks that will not be referenced in subsequent CTU processing, from the respective memory regions. This enables encoder 100 to store, in, for example, the cleared storage region, information on motion vectors derived in subsequent CTU processing.

When encoder 100 determines that current block 27 is not the last block in the current CTU (no in step S2003), encoder 100 does not clear the memory region in which information on the motion vectors at positions of blocks that will not be referenced in subsequent CTU processing, from among information on motion vectors for referencing spatially broad motion vector predictors that is stored in, for example, memory. In other words, from among information stored in, for example, memory, on motion vectors for referencing spatially broad motion vector predictors, encoder 100 does not delete information on motion vectors at positions of blocks that will not be referenced in subsequent CTU processing, from the respective memory regions.

Here, encoder 100 concludes operations.

Accordingly, encoder 100 can manage memory regions efficiently with a simple management method. As such, encoder 100 increases the probability of being able to reduce the scale of the circuitry and storage region of memory, etc., included in encoder 100.

Note that the processes and flow of processes described in FIG. 16 are merely one example; one or more of the processes described in FIG. 16 may be omitted, a process not described in FIG. 16 may be added, and the order of processes described in FIG. 16 may be rearranged.

Moreover, decoder 200 may perform the operations from step S2000 to step S1004 described in FIG. 16 by switching encoding with decoding.

With the configuration described in FIG. 12 through FIG. 16, in the generation of a motion vector predictor list in merge mode, encoder 100 or decoder 200 enable the following. Upon referencing motion vector predictors, encoder 100 or decoder 200 can restrict the referencing to processed blocks (i) positioned in a range that is broader than the range of positions of blocks that neighbor current block 27 and (ii) spaced apart by a predetermined interval using the top-left of current picture 25 as a reference point. This makes it possible for encoder 100 to significantly reduce the amount of information to be stored in, for example, memory, on motion vectors used for referencing spatially broad motion vector predictors obtained as motion vector predictors. Accordingly, encoder 100 or decoder 200 allows for a reduction in the scale of the circuitry included in encoder 100 or decoder 200.

Variation

The variation described hereinafter applies to both encoder 100 and decoder 200. Hereinafter, the content of, for example, processes described with reference to encoder 100 can be applied to processes performed by decoder 200 by reading "encoder 100" as "decoder 200".

Encoder 100 may apply the processes described in this embodiment to a prediction mode other than merge mode for performing a prediction process using the motion vector predictor list. Specifically, encoder 100 may use the processes described in this embodiment in the generation or usage, etc., of a motion vector predictor list used for deriving motion vector predictors in normal inter mode, or in the generation or usage, etc., of a candidate motion vector list for specifying motion vectors in FRUC mode. This makes it possible to, in prediction modes other than merge mode as well, obtain motion vector predictors and derive motion vectors more efficiently than conventional methods, by referencing blocks, while also reducing the scale of circuitry included in encoder 100. In other words, the possibility that the coding efficiency of encoder 100 can be improved in a plurality of prediction modes increases.

Note that the spatially broad motion vector predictors according to the present disclosure may be motion vector predictors obtained by encoder 100 by referencing, from among blocks positioned inside current picture 25, blocks other than blocks that spatially neighbor current block 27. Moreover, the spatially broad motion vector predictors may be motion vector predictors obtained by encoder 100 by referencing blocks that spatially neighbor current block 27, excluding blocks referenced for the purpose of obtaining spatially neighboring motion vector predictors.

Note that the spatially broad motion vector predictors according to this embodiment may be determined as follows. First, encoder 100 determines a first block made up of a plurality of blocks in current picture 25. Here, the first block is a block positioned in the area spatially surrounding current block 27, and may be a block including one of pixel positions determined using a predetermined pixel position in current picture 25 as a reference point by encoder 100. Specifically, as illustrated in FIG. 13 through FIG. 15, the first block may be a block including one of pixel positions spaced apart by a predetermined interval, using the top-left pixel position of current picture 25 as a reference point. Moreover, in such cases, the first block may be the same in all blocks in current picture 25.

Moreover, for example, encoder 100 may determine the first blocks to be blocks including one of pixel positions spaced apart by a predetermined distance using the top-left pixel in the current CTU including current block 27 as a reference point. In such cases, the first block may be the same in all blocks included in the current CTU. In other words, encoder 100 may determine all same blocks among the plurality of blocks in current picture 25 to be the first block.

Next, encoder 100 determines a second block from among the first blocks. Here, the second block is a block determined based on current block 27, from among first blocks, and may be a block that precedes current block 27 in processing order by encoder 100. Specifically, as illustrated in FIG. 13 through FIG. 15, the second block may be a block positioned within a given range determined based on the position of the block closest to current block 27 from among blocks positioned in the surrounding area of the left and top edges of current block 27. Moreover, for example, the second block may be a block within the given range determined based on the position of the current CTU including current block 27. In such cases, the second block may be the same in all blocks included in the current CTU.

Next, encoder 100 obtains a motion vector by referring to a second block, and registers the obtained motion vector in the prediction motion vector list as a spatially broad prediction motion vector for current block 27.

Note that in the determining of spatially broad motion vector predictors, blocks that may potentially be referenced for obtaining spatially broad motion vector predictors in current picture 25 may be defined as third blocks. In such cases, encoder 100 may determine a plurality of first blocks from the plurality of third blocks. Specifically, blocks that precede current block 27 in processing order by encoder 100 may be determined to be third blocks. Then, among the third blocks, blocks including pixel positions determined based on predetermined pixel positions in current picture 25 may be determined to be first blocks, as illustrated in FIG. 13 through FIG. 15. Here, encoder 100 need not store information on the motion vectors for all third blocks in, for example, memory; it is sufficient if encoder 100 stores the motion vector information on the first blocks in, for example, memory.

[Implementation]

Figure 17:
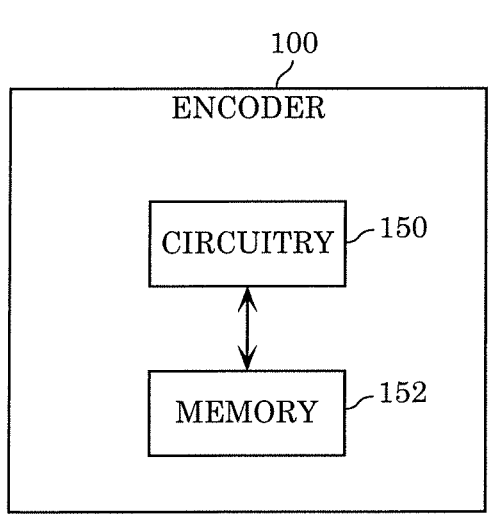
FIG. 17 is a block diagram illustrating an implementation example of an encoder according to Embodiment 1.

FIG. 17 is a block diagram illustrating an implementation example of an encoder according to Embodiment 1. Encoder 100 includes circuitry 150 and memory 152. For example, the plurality of elements included in encoder 100 illustrated in FIG. 1 are implemented as circuitry 150 and memory 152 illustrated in FIG. 17.

Circuitry 150 is electronic circuitry that is capable of accessing memory 152, and performs information processing. For example, circuitry 150 is dedicated or generic electronic circuitry that encodes a video using memory 152. Circuitry 150 may be a processor such as a CPU. Moreover, circuitry 150 may be an aggregate of a plurality of electronic circuits.

Moreover, for example, circuitry 150 may perform the roles of a plurality of elements from among the plurality of elements included in encoder 100 illustrated in FIG. 1, excluding elements for storing information. In other words, circuitry 150 may performed the above-described operations as the operations performed by those elements.

Memory 152 is dedicated or generic memory that stores information for circuitry 150 to encode a video. Memory 152 may be electronic circuitry, may be coupled to circuitry 150, and may be included in circuitry 150.

Moreover, memory 152 may be an aggregate of a plurality of electronic circuits, and may be configured of a plurality of sub-memories. Moreover, memory 152 may be, for example, a magnetic disk or an optical disk, and may be realized as storage or a recording medium, for example. Moreover, memory 152 may be nonvolatile memory, and may be volatile memory.

For example, memory 152 may perform the roles of, from among the plurality of elements included in encoder 100 illustrated in FIG. 1, those for storing information.

Moreover, memory 152 may store an encoded video, and may store a sequence of bits corresponding to an encoded video. Moreover, memory 152 may store a program for circuitry 150 to encode a video.

Note that not all of the plurality of elements illustrated in FIG. 1 need to be implemented in encoder 100, and not all of the above-described processes need to be performed. Some of the plurality of elements illustrated in FIG. 1 may be included in some other device, and some of the above-described processes may be executed by some other device. Then, due to some of the plurality of elements illustrated in FIG. 1 being implemented in encoder 100 and some of the above-described processes being performed by encoder 100, information related to video encoding can be appropriately configured.

Figure 18:
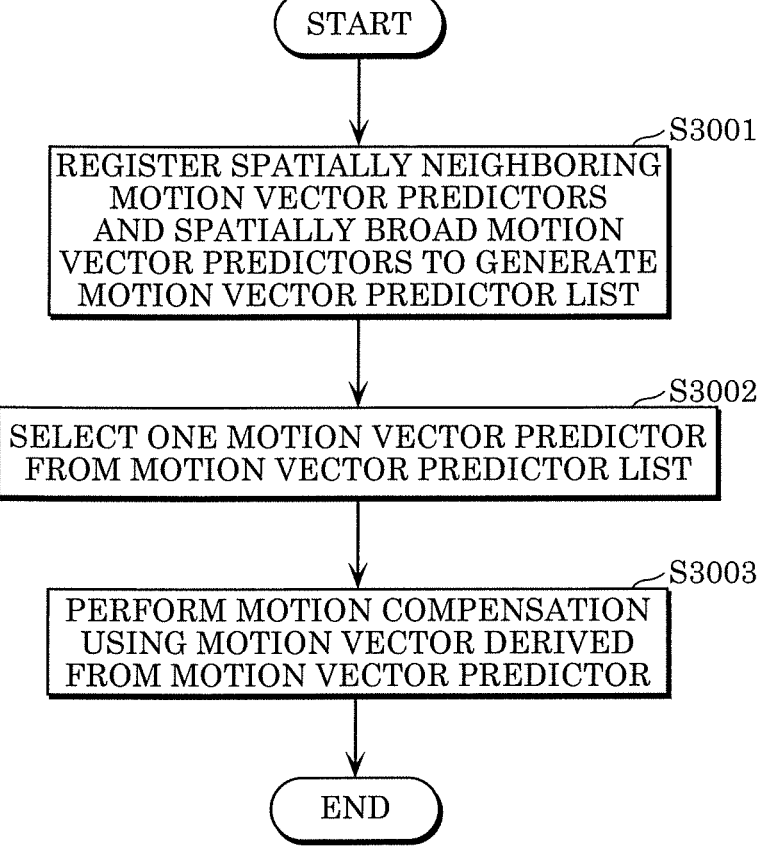
FIG. 18 is a flow chart illustrating an example of operations performed by an encoder according to Embodiment 1.

FIG. 18 is a flow chart illustrating an example of operations performed by an encoder according to Embodiment 1. For example, encoder 100 illustrated in FIG. 17 performs the processes illustrated in FIG. 18 upon performing prediction in merge mode. Specifically, circuitry 150 performs the following operations using memory 152.

First, encoder 100 generates a motion vector predictor list by registering spatially neighboring motion vector predictors and spatially broad motion vector predictors (step S3001).

Next, encoder 100 selects one motion vector predictor from the motion vector predictor list (step S3002).

Encoder 100 then performs motion compensation on current block 27 using a motion vector derived from the motion vector predictor (step S3003).

The processes illustrated in S3001 through S3003 and performed by encoder 100 may be performed in merge mode.

Moreover, encoder 100 may define blocks (i) positioned in a range that is broader than the range of positions of blocks that neighbor current block 27 and (ii) spaced apart by a predetermined interval as reference blocks having a specific size. Moreover, information on motion vectors to be referenced by encoder 100 may be managed in association with the reference blocks.

Moreover, encoder 100 may be capable of adaptively switching, based on the capability of encoder 100 or the size, etc., of current picture 25, the range of blocks positioned in a range that is broader than the range of positions of blocks that neighbor current block 27. Moreover, encoder 100 may be capable of adaptively switching, based on the capability of encoder 100 or the size, etc., of current picture 25, the predetermined interval that the blocks are spaced apart by.

Moreover, encoder 100 may write, into the slice, picture, or sequence header, information specifying the predetermined interval of the blocks (i) positioned in a range that is broader than the range of positions of blocks that neighbor current block 27 and (ii) spaced apart by a predetermined interval, or the range of positions of the blocks (i) positioned in a range that is broader than the range of positions of blocks that neighbor current block 27 and (ii) spaced apart by a predetermined interval.

For example, when the capability of encoder 100 is a first capability that is lower than a first reference, the predetermined interval of the blocks (i) positioned in a range that is broader than the range of positions of blocks that neighbor current block 27 and (ii) spaced apart by a predetermined interval may be a first interval, and when the capability of encoder 100 is a second capability that is higher than the first reference, the predetermined interval may be a second interval that is narrower than the first interval. In other words, when the capability of encoder 100 is lower than a reference, encoder 100 may narrow the predetermined interval of blocks (i) positioned in a range that is broader than the range of positions of blocks that neighbor current block 27 and (ii) spaced apart by a predetermined interval. Moreover, when the capability of encoder 100 is higher than a reference, encoder 100 may widen the predetermined interval of blocks (i) positioned in a range that is broader than the range of positions of blocks that neighbor current block 27 and (ii) spaced apart by a predetermined interval.

Moreover, for example, when the capability of encoder 100 is a third capability that is lower than a second reference, the number of reference blocks in predetermined positions to be referenced for motion vector predictor list generation in a range that is broader than the range of positions of blocks neighboring current block 27 may be a first number, and when the capability of encoder 100 is a fourth capability that is higher than the second reference, the number of reference blocks in predetermined positions to be referenced for motion vector predictor list generation in a range that is broader than the range of positions of blocks neighboring current block 27 may be a second number that is greater than the first number. In other words, when the capability of encoder 100 is lower than a reference, encoder 100 may reduce the number of reference blocks in a range that is broader than the range of positions of blocks that neighbor current block 27. Moreover, when the capability of encoder 100 is higher than a reference, encoder 100 may increase the number of reference blocks in a range that is broader than the range of positions of blocks that neighbor current block 27.

With this, even when the capability of encoder 100 is low, encoder 100 can perform processing of an amount processable by encoder 100 and within the range of memory capacity of encoder 100.

Moreover, for example, when the size of current picture 25 is a first size that is larger than a third reference, the predetermined interval of the blocks (i) positioned in a range that is broader than the range of positions of blocks that neighbor current block 27 and (ii) spaced apart by the predetermined interval may be a third interval, and when the size of current picture 25 is a second size that is smaller than the third reference, the predetermined interval may be a fourth interval that is narrower than the third interval. In other words, when the size of current picture 25 is larger than a reference, encoder 100 may widen the predetermined interval of blocks (i) positioned in a range that is broader than the range of positions of blocks that neighbor current block 27 and (ii) spaced apart by the predetermined interval. Moreover, when the size of current picture 25 is smaller than a reference, encoder 100 may narrow the predetermined interval of blocks (i) positioned in a range that is broader than the range of positions of blocks that neighbor current block 27 and (ii) spaced apart by the predetermined interval.

Moreover, for example, when the size of current picture 25 is a third size that is larger than a fourth reference, the number of reference blocks in predetermined positions to be referenced for motion vector predictor list generation in a range that is broader than the range of positions of blocks neighboring current block 27 may be a third number, and when the size of current picture 25 is a fourth size that is smaller than the fourth reference, the number of reference blocks in predetermined positions to be referenced for motion vector predictor list generation in a range that is broader than the range of positions of blocks neighboring current block 27 may be a fourth number that is less than the third number. In other words, when the size of current picture 25 is larger than a reference, encoder 100 may increase the number of reference blocks in a range that is broader than the range of positions of blocks that neighbor current block 27. Moreover, when the size of current picture 25 is smaller than a reference, encoder 100 may reduce the number of reference blocks in a range that is broader than the range of positions of blocks that neighbor current block 27.

With this, when the size of current picture 25 is large, encoder 100 can reference a motion vector from a block positioned in a range that is broader than when the size of current picture 25 is small. Accordingly, compared to when encoder 100 does not perform the above method, encoder 100 can obtain motion vector predictors more appropriately, and can improve coding efficiency.

Moreover, encoder 100 may store information on motion vectors assigned to reference blocks in memory.

Moreover, circuitry 150 may store information on motion vectors in units of reference blocks in memory 152, and when current block 27 is a block including a reference block at a position defined by the regular interval, may store information on motion vectors derived from current block 27 in memory 152.

Figure 19:
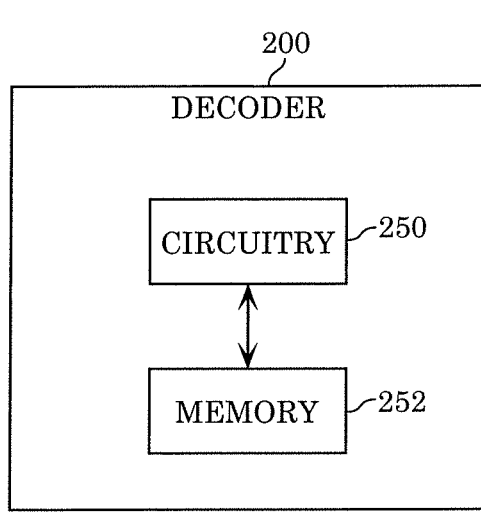
FIG. 19 is a block diagram illustrating an implementation example of a decoder according to Embodiment 1.

FIG. 19 is a block diagram illustrating an implementation example of a decoder according to Embodiment 1. Decoder 200 includes circuitry 250 and memory 252. For example, the plurality of elements included in decoder 200 illustrated in FIG. 10 are implemented as circuitry 250 and memory 252 illustrated in FIG. 19.

Circuitry 250 is electronic circuitry that is capable of accessing memory 252, and performs information processing. For example, circuitry 250 is dedicated or generic electronic circuitry that decodes a video using memory 252. Circuitry 250 may be a processor such as a CPU. Moreover, circuitry 250 may be an aggregate of a plurality of electronic circuits.

Moreover, for example, circuitry 250 may perform the roles of a plurality of elements from among the plurality of elements included in decoder 200 illustrated in FIG. 10, excluding elements for storing information. In other words, circuitry 250 may performed the above-described operations as the operations performed by those elements.

Memory 252 is dedicated or generic memory that stores information for circuitry 250 to decode a video. Memory 252 may be electronic circuitry, may be coupled to circuitry 250, and may be included in circuitry 250.

Moreover, memory 252 may be an aggregate of a plurality of electronic circuits, and may be configured of a plurality of sub-memories. Moreover, memory 252 may be, for example, a magnetic disk or an optical disk, and may be realized as storage or a recording medium, for example. Moreover, memory 252 may be nonvolatile memory, and may be volatile memory.

For example, memory 252 may perform the roles of, from among the plurality of elements included in decoder 200 illustrated in FIG. 10, those for storing information.

Moreover, memory 252 may store a decoded video, and may store a sequence of bits corresponding to a decoded video. Moreover, memory 252 may store a program for circuitry 250 to decode a video.

Note that not all of the plurality of elements illustrated in FIG. 10 need to be implemented in decoder 200, and not all of the above-described processes need to be performed. Some of the plurality of elements illustrated in FIG. 10 may be included in some other device, and some of the above-described processes may be executed by some other device. Then, due to some of the plurality of elements illustrated in FIG. 10 being implemented in decoder 200 and some of the above-described processes being performed by decoder 200, information related to video decoding can be appropriately configured.

Figure 20:
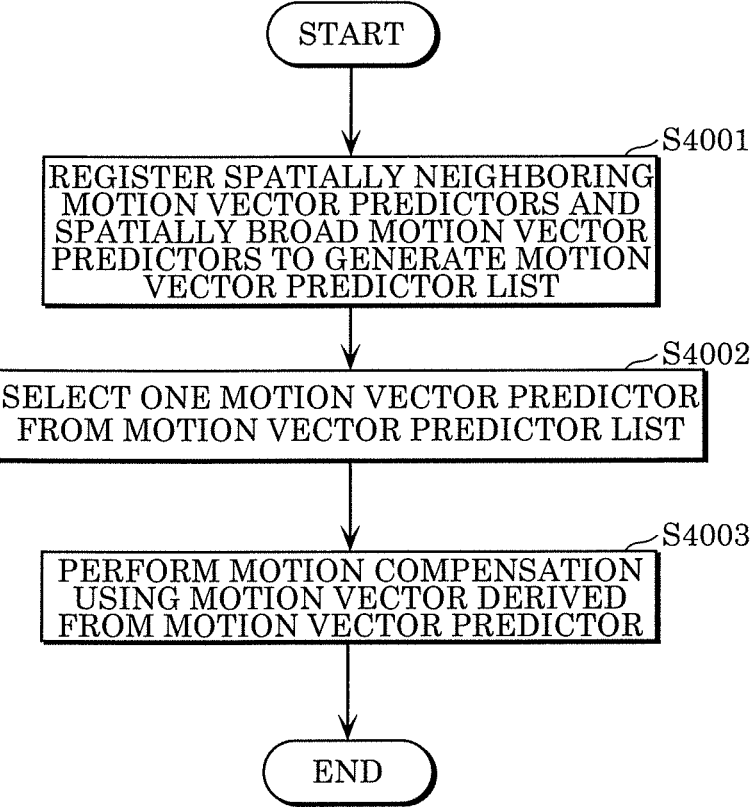
FIG. 20 is a flow chart illustrating an example of operations performed by a decoder according to Embodiment 1.

FIG. 20 is a flow chart illustrating an example of operations performed by a decoder according to Embodiment 1. For example, decoder 200 illustrated in FIG. 19 performs the processes illustrated in FIG. 20 upon initializing probability parameters for entropy decoding. Specifically, circuitry 250 performs the following operations using memory 252.

First, decoder 200 generates a motion vector predictor list by registering spatially neighboring motion vector predictors and spatially broad motion vector predictors (step S4001).

Next, decoder 200 selects one motion vector predictor from the motion vector predictor list (step S4002).

Decoder 200 then performs motion compensation on current block 27 using a motion vector derived from the motion vector predictor (step S4003).

Here, in the decoder 200, information on motion vectors to be referenced in prediction mode may be managed in association with reference blocks of a specific size, and the plurality of predetermined positions may be positions of, from among the reference blocks, reference blocks at positions defined by a regular interval using the top-left of the current picture as a reference point.

Moreover, the processes illustrated in S4001 through S4003 and performed by decoder 200 may be performed in merge mode.

Moreover, decoder 200 may define blocks (i) positioned in a range that is broader than the range of positions of blocks that neighbor current block 27 and (ii) spaced apart by a predetermined interval as reference blocks having a specific size. Moreover, information on motion vectors to be referenced by decoder 200 may be managed in association with the reference blocks.

Moreover, decoder 200 may be capable of adaptively switching, based on the capability of decoder 200 or the size, etc., of current picture 25, the range of blocks positioned in a range that is broader than the range of positions of blocks that neighbor current block 27.

Moreover, decoder 200 may write, into the slice, picture, or sequence header, information specifying the interval of the blocks (i) positioned in a range that is broader than the range of positions of blocks that neighbor current block 27 and (ii) spaced apart by a predetermined interval, or the range of positions of the blocks.

For example, when the capability of decoder 200 is a first capability that is lower than a first reference, the predetermined interval of the blocks (i) positioned in a range that is broader than the range of positions of blocks that neighbor current block 27 and (ii) spaced apart by a predetermined interval may be a first interval, and when the capability of decoder 200 is a second capability that is higher than the first reference, the predetermined interval may be a second interval that is narrower than the first interval. In other words, when the capability of decoder 200 is lower than a reference, decoder 200 may narrow the predetermined interval of blocks (i) positioned in a range that is broader than the range of positions of blocks that neighbor current block 27 and (ii) spaced apart by a predetermined interval. Moreover, when the capability of decoder 200 is higher than a reference, decoder 200 may widen the predetermined interval of blocks (i) positioned in a range that is broader than the range of positions of blocks that neighbor current block 27 and (ii) spaced apart by a predetermined interval.

Moreover, for example, when the capability of decoder 200 is a third capability that is lower than the second reference, the number of reference blocks in predetermined positions to be referenced for motion vector predictor list generation in a range that is broader than the range of positions of blocks neighboring current block 27 may be a first number, and when the capability of decoder 200 is a fourth capability that is higher than the second reference, the number of reference blocks in predetermined positions to be referenced for motion vector predictor list generation in a range that is broader than the range of positions of blocks neighboring current block 27 may be a second number that is greater than the first number. In other words, when the capability of decoder 200 is lower than a reference, decoder 200 may reduce the number of reference blocks in a range that is broader than the range of positions of blocks that neighbor current block 27. Moreover, when the capability of decoder 200 is higher than a reference, decoder 200 may increase the number of reference blocks in a range that is broader than the range of positions of blocks that neighbor current block 27.

With this, even when the capability of decoder 200 is low, decoder 200 can perform processing of an amount processable by decoder 200 and within the range of memory capacity of decoder 200.

Moreover, for example, when the size of current picture 25 is a first size that is larger than a third reference, the predetermined interval of the blocks (i) positioned in a range that is broader than the range of positions of blocks that neighbor current block 27 and (ii) spaced apart by the predetermined interval may be a third interval, and when the size of current picture 25 is a second size that is smaller than the third reference, the predetermined interval may be a fourth interval that is narrower than the third interval. In other words, when the size of current picture 25 is larger than a reference, decoder 200 may widen the predetermined interval of blocks (i) positioned in a range that is broader than the range of positions of blocks that neighbor current block 27 and (ii) spaced apart by the predetermined interval. Moreover, when the size of current picture 25 is smaller than a reference, decoder 200 may narrow the predetermined interval of blocks (i) positioned in a range that is broader than the range of positions of blocks that neighbor current block 27 and (ii) spaced apart by the predetermined interval.

Moreover, for example, when the size of current picture 25 is a third size that is larger than a fourth reference, the number of reference blocks in predetermined positions to be referenced for motion vector predictor list generation in a range that is broader than the range of positions of blocks neighboring current block 27 may be a third number, and when the size of current picture 25 is a fourth size that is smaller than the fourth reference, the number of reference blocks in predetermined positions to be referenced for motion vector predictor list generation in a range that is broader than the range of positions of blocks neighboring current block 27 may be a fourth number that is less than the third number. In other words, when the size of current picture 25 is larger than a reference, decoder 200 may increase the number of reference blocks in a range that is broader than the range of positions of blocks that neighbor current block 27. Moreover, when the size of current picture 25 is smaller than a reference, decoder 200 may reduce the number of reference blocks in a range that is broader than the range of positions of blocks that neighbor current block 27.

With this, when the size of current picture 25 is large, decoder 200 can reference a motion vector from a block positioned in a range that is broader than when the size of current picture 25 is small. Accordingly, compared to when decoder 200 does not perform the above method, decoder 200 can obtain motion vector predictors more appropriately, and can improve coding efficiency.

Moreover, decoder 200 may store information on motion vectors assigned to reference blocks in memory.

Moreover, circuitry 150 may store information on motion vectors assigned to reference blocks in memory 152, and when current block 27 is a block including a reference block at a position defined by the regular interval, may store information on motion vectors derived from current block 27 in memory 152.

[Supplemental Information]

Encoder 100 and decoder 200 according to this embodiment may be used as an image encoder and an image decoder, respectively, and may be used as a video encoder and a video decoder, respectively.

Note that in the above embodiment, each element may be configured in the form of dedicated hardware, or may be realized by executing a software program suitable for the elements. Each element may be realized by a program executing unit, such as a CPU or a processor, reading and executing the software program recorded on a recording medium such as a hard disk or semiconductor memory.

Specifically, encoder 100 and decoder 200 may include processing circuitry and storage which is electrically coupled to the processing circuitry and accessible from the processing circuitry. For example, the processing circuitry corresponds to circuitry 150 or 250, and the storage corresponds to memory 152 or 252.

The processing circuitry includes at least one of dedicated hardware and a program executing unit, and executes processes using the storage. In addition, when the processing circuitry includes the program executing unit, the storage stores a software program that is executed by the program executing unit.

Here, the software for realizing, for example, encoder 100 or decoder 200 according to this embodiment is a program as described below.

The program may cause a computer to execute an encoding method that encodes a video and includes generating a motion vector predictor list by registering motion vector predictors obtained by referencing a plurality of encoded blocks, selects one motion vector predictor from the motion vector predictor list, and implements a prediction mode that performs motion compensation using a motion vector derived from the one motion vector predictor. The motion vector predictor list may include a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. The plurality of predetermined positions may be defined by a regular interval using a top-left of a current picture as a reference point.

The program may cause a computer to execute a decoding method that decodes a video and includes generating a motion vector predictor list by registering motion vector predictors obtained by referencing a plurality of decoded blocks, selects one motion vector predictor from the motion vector predictor list, and implements a prediction mode that performs motion compensation using a motion vector derived from the one motion vector predictor. The motion vector predictor list may include a spatially neighboring motion vector predictor obtained from a block spatially neighboring a current block, and a spatially broad motion vector predictor obtained from a block positioned at any of a plurality of predetermined positions in a second range that is broader than a first range that spatially neighbors the current block. The plurality of predetermined positions may be defined by a regular interval using a top-left of a current picture as a reference point.

Moreover, each element may be implemented as circuitry, as described above. Such circuitry may include a single comprehensive circuit or a plurality of circuits, one for each element. Moreover, each element may be implemented as a general purpose processor, and may be implemented as a dedicated processor.

Processes executed by specific elements may be executed by other elements. Moreover, the order of execution of the process may be changed, and a plurality of processes may be executed in parallel. Moreover, the encoder/decoder may include both encoder 100 and decoder 200.

Moreover, the ordinal numbers such as "first" and "second" used in the description may be changed where appropriate. New ordinal numbers may be applied to, for example, the elements, and the ordinal numbers may be removed from, for example, the elements.

Hereinbefore, an aspect of encoder 100 and decoder 200 has been described based on an embodiment, but aspects of encoder 100 and decoder 200 are not limited to this embodiment. Aspects of encoder 100 and decoder 200 may also encompass various modifications that may be conceived by those skilled in the art to the embodiments, and embodiments achieved by combining elements in different embodiments, without departing from the scope of the present disclosure.

The aspect may be implemented in combination with one or more of the other aspects according to the present disclosure. In addition, a portion of the processes in the flowcharts, a portion of the elements included in the apparatuses, and a portion of the syntax described in this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 21:
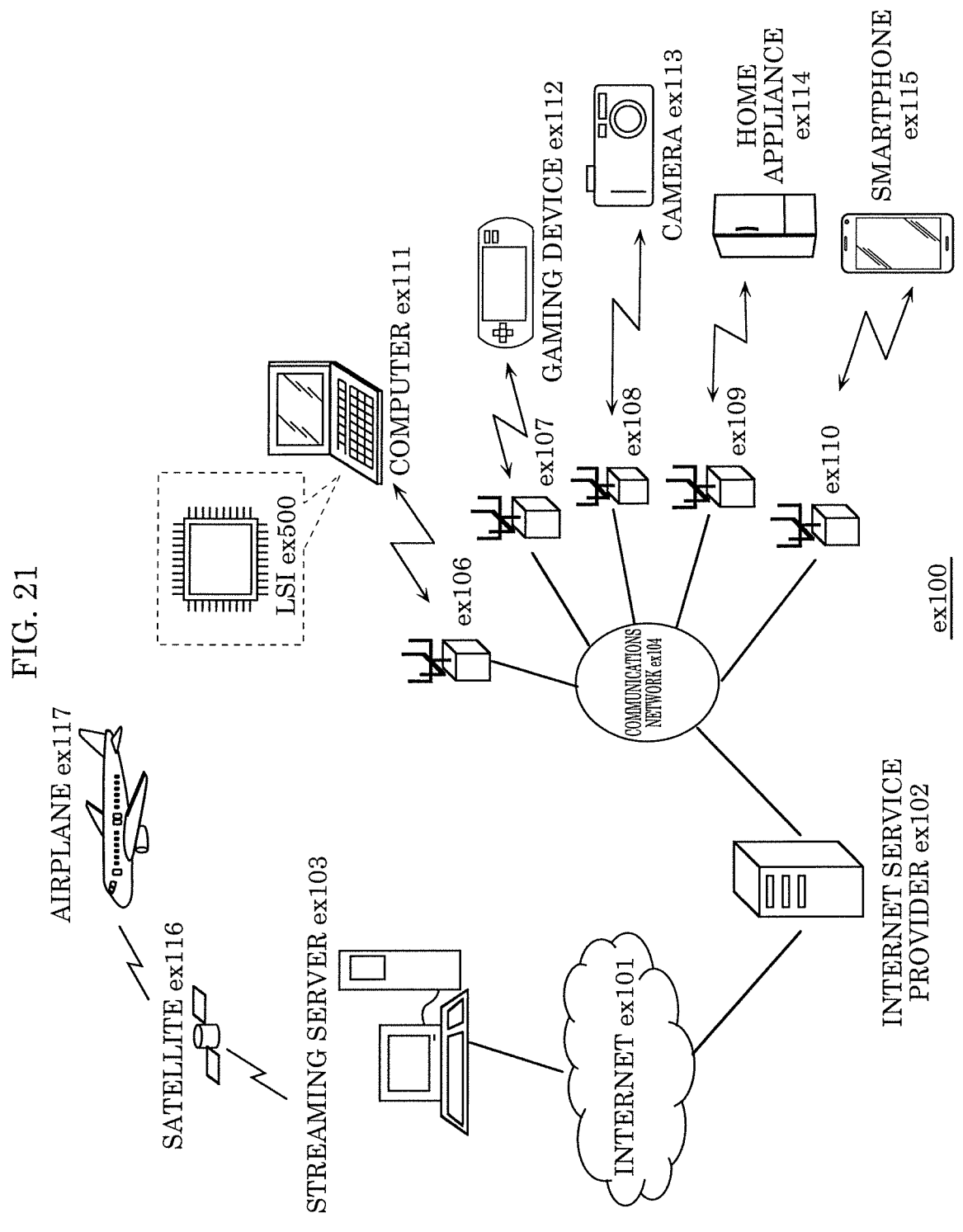
FIG. 21 illustrates an overall configuration of a content providing system for implementing a content distribution service.

FIG. 21 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 22:
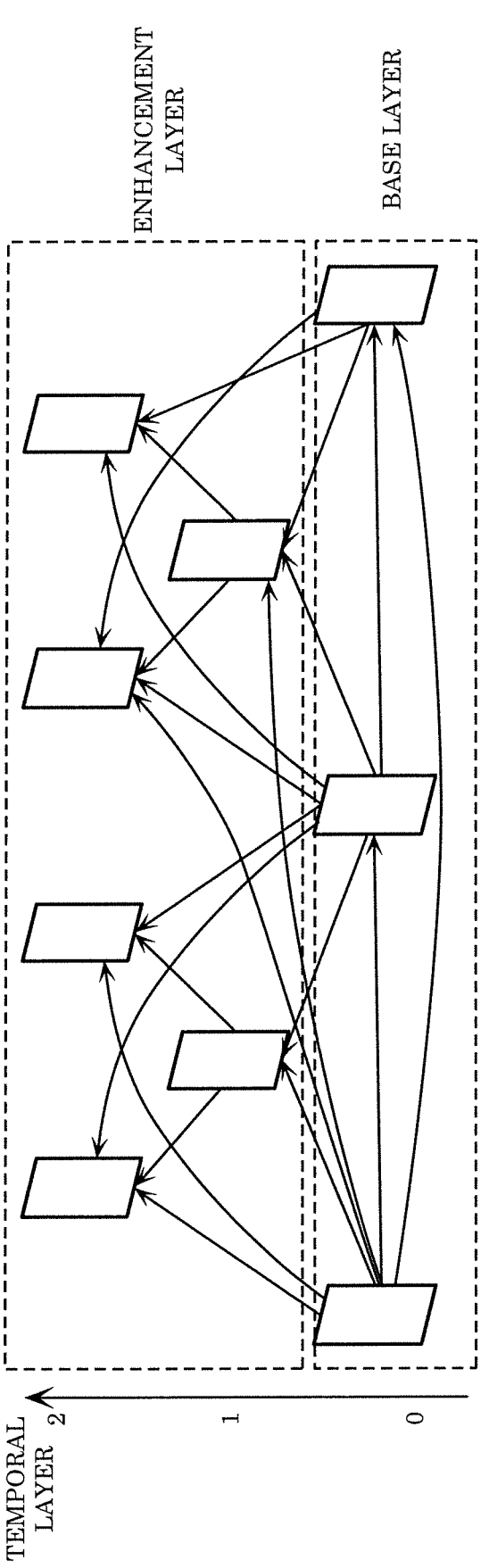
FIG. 22 illustrates one example of encoding structure in scalable encoding.

The switching of content will be described with reference to a scalable stream, illustrated in FIG. 22, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 22. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 23:
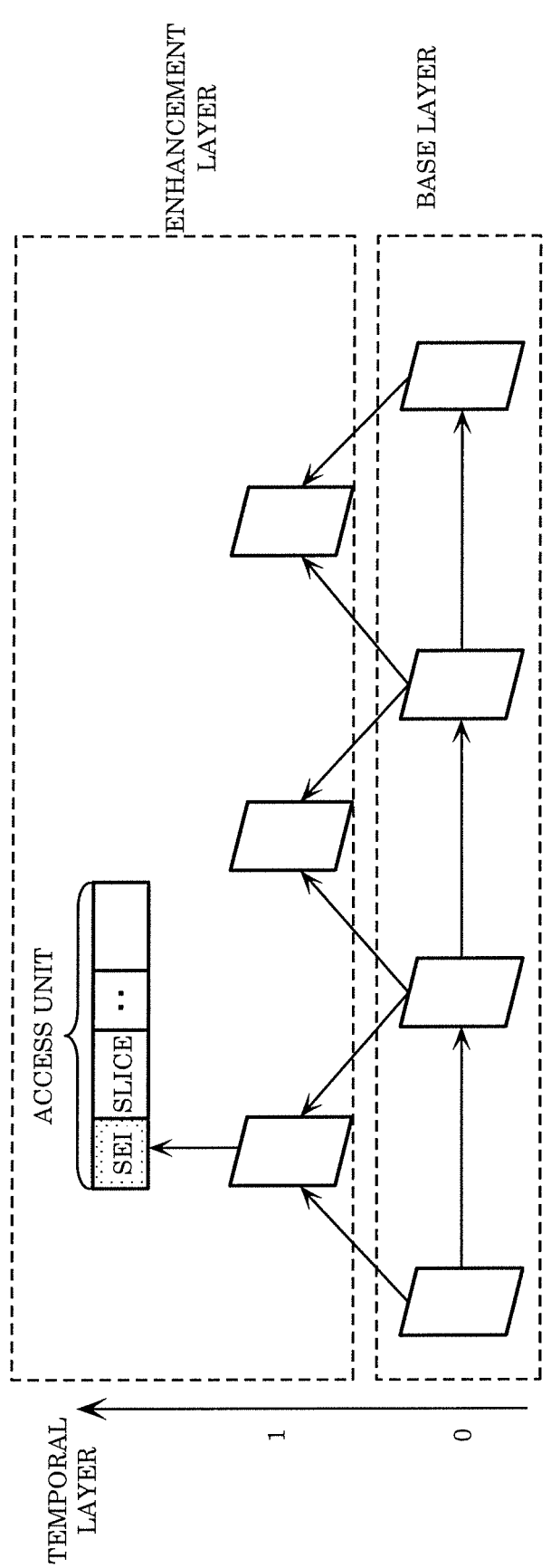
FIG. 23 illustrates one example of encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 23, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 24:
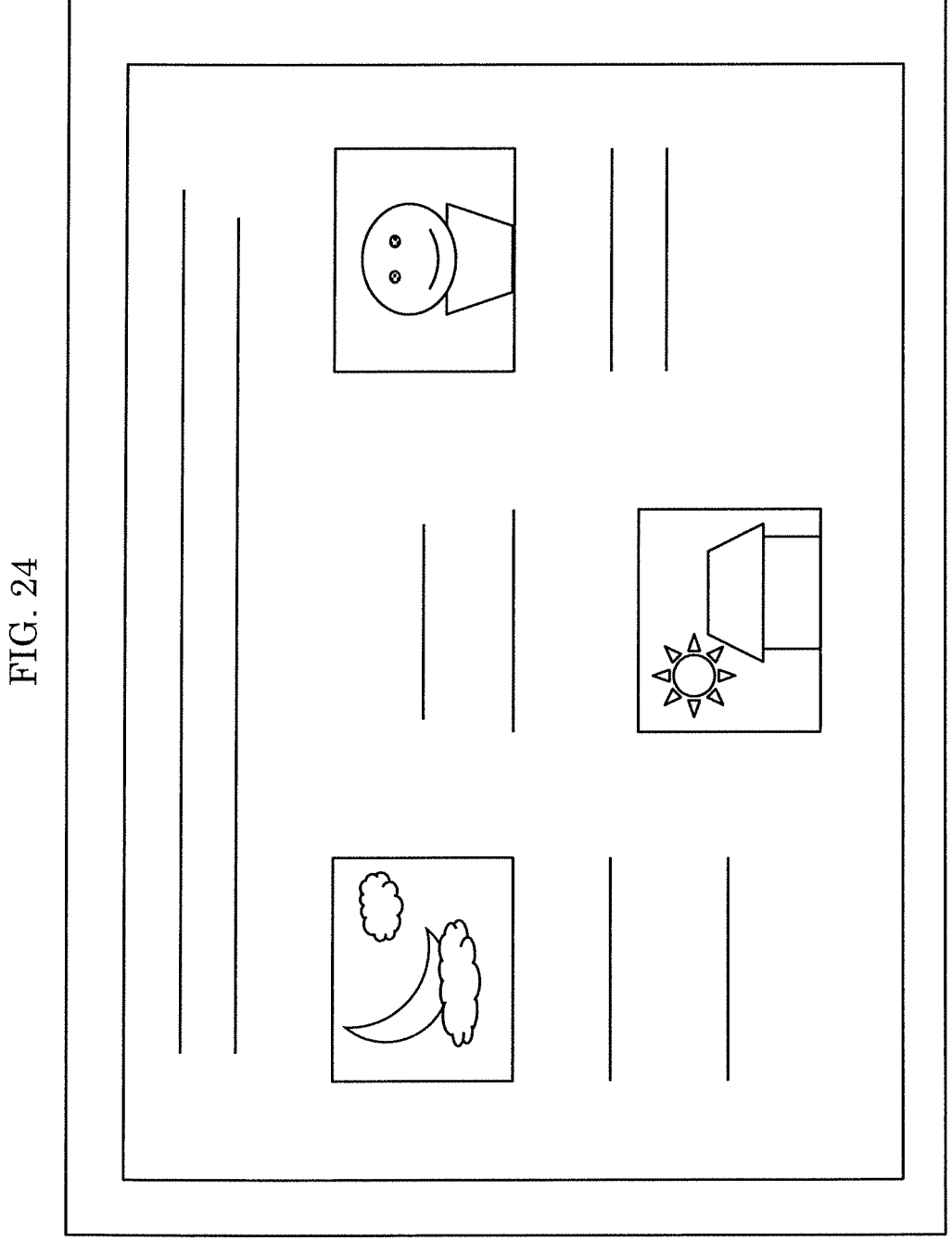
FIG. 24 illustrates an example of a display screen of a web page.
Figure 25:
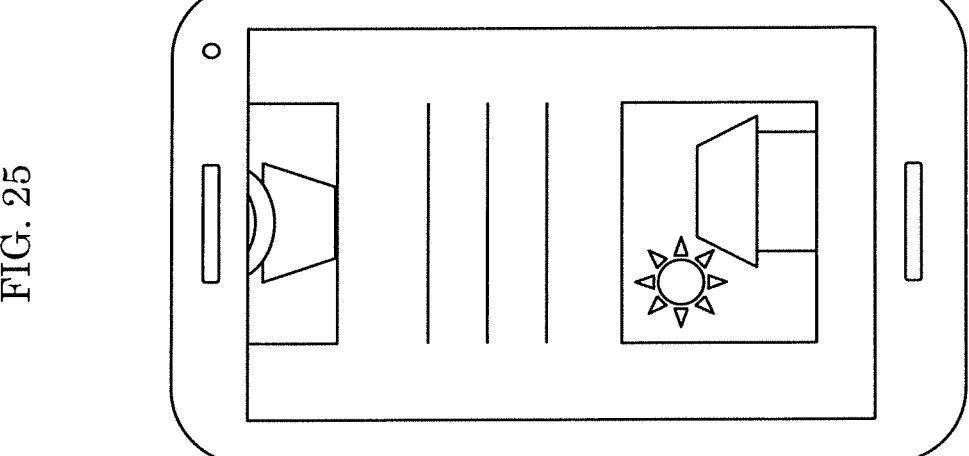
FIG. 25 illustrates an example of a display screen of a web page.

FIG. 24 illustrates an example of a display screen of a web page on, for example, computer ex111. FIG. 25 illustrates an example of a display screen of a web page on, for example, smartphone ex115. As illustrated in FIG. 24 and FIG. 25, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer.

Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 26:
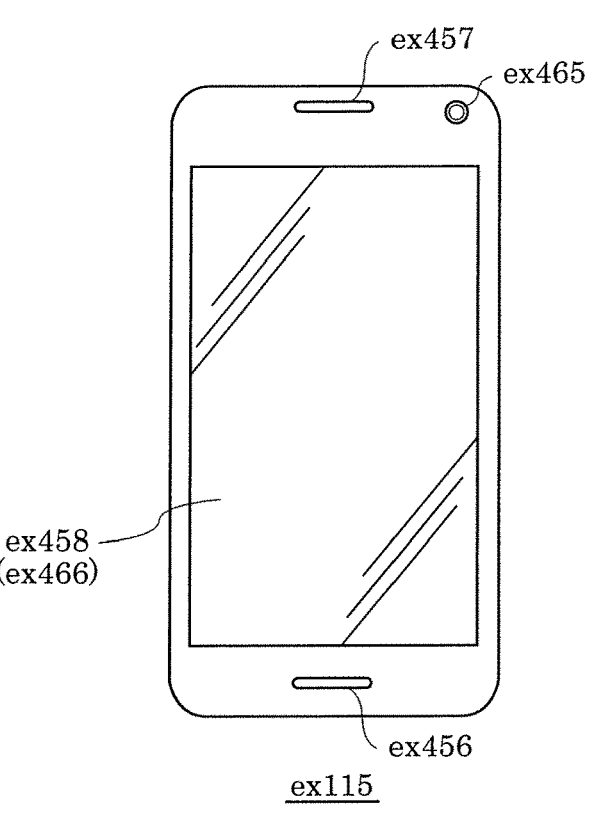
FIG. 26 illustrates one example of a smartphone.
Figure 27:
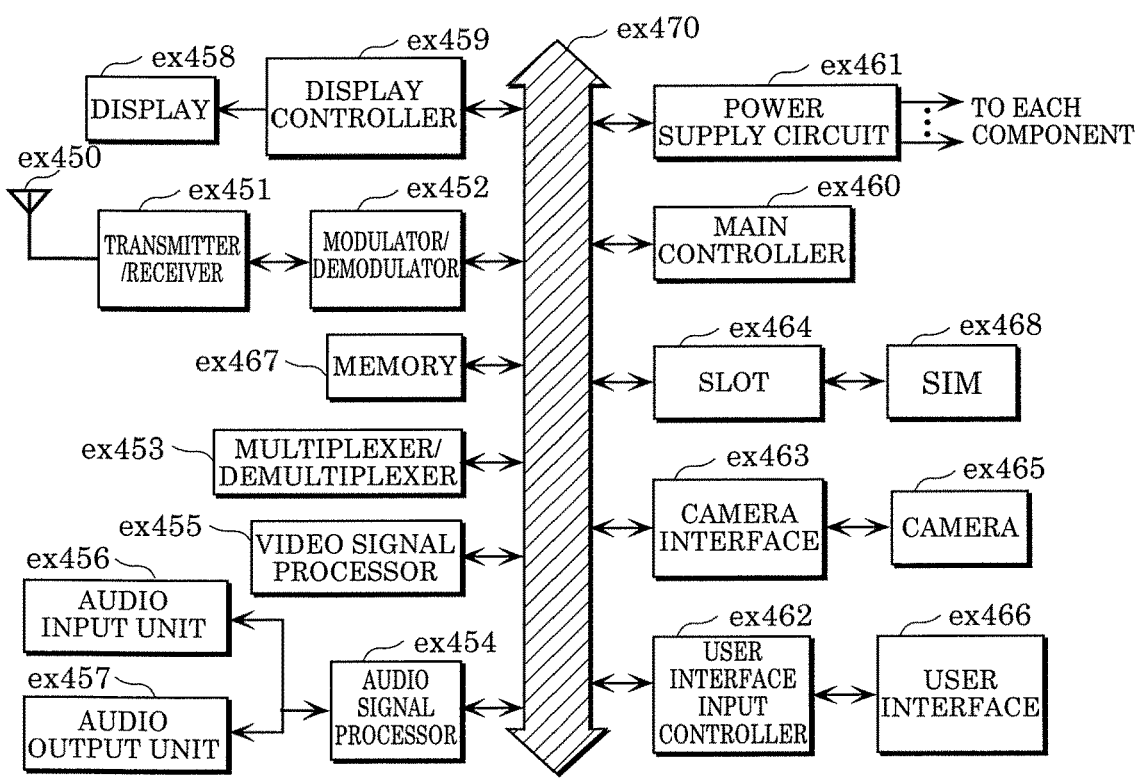
FIG. 27 is a block diagram illustrating a configuration example of a smartphone.

FIG. 26 illustrates smartphone ex115. FIG. 27 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to, for example, television receivers, digital video recorders, car navigation systems, mobile phones, digital cameras, digital video cameras, video conference systems, and electron mirrors.

The invention claimed is:

1. An encoder that encodes a video, the encoder comprising:

circuitry; and memory, wherein, using the memory, the circuitry:

generates a motion vector predictor list by registering motion vector predictors obtained by referencing a plurality of encoded blocks;

selects one motion vector predictor of a current block from the motion vector predictor list; and performs motion compensation to the current block in a prediction mode by using a motion vector derived from the one motion vector predictor, the motion vector predictor list includes (i) a first motion vector predictor obtained from a block in a first range that spatially neighbors the current block, and (ii) a second motion vector predictor obtained from a block positioned at any of a plurality of predetermined positions in a second range that is broader than the first range, information which indicates the motion vectors to be referenced in the prediction mode is managed in association with reference blocks of a specific size, the reference blocks being included in the current block, and the motion vector managed in association with a reference block from among the reference blocks is registered as a second motion vector predictor of a block different from the current block, the reference block is located at the predetermined position, and the plurality of predetermined positions are defined by a regular interval larger than the specific size.

2. A non-transitory computer readable medium storing a bitstream, the bitstream including an encoded signal and syntax information according to which a decoder performs a method comprising:

generating a motion vector predictor list by registering motion vector predictors obtained by referencing a plurality of encoded blocks;

selecting one motion vector predictor of a current block from the motion vector predictor list; and performing motion compensation to the current block in a prediction mode by using a motion vector derived from the one motion vector predictor, wherein the motion vector predictor list includes (i) a first motion vector predictor obtained from a block in a first range that spatially neighbors the current block, and (ii) a second motion vector predictor obtained from a block positioned at any of a plurality of predetermined positions in a second range that is broader than the first range, information which indicates the motion vectors to be referenced in the prediction mode is managed in association with reference blocks of a specific size, the reference blocks being included in the current block, and the motion vector managed in association with a reference block from among the reference blocks is registered as a second motion vector predictor of a block different from the current block, the reference block is located at the predetermined position, and the plurality of predetermined positions are defined by a regular interval larger than the specific size.

\* \* \* \* \*